US005711750A

United States Patent [19]

Christensen et al.

[11] Patent Number: 5,711,750

[45] Date of Patent: Jan. 27, 1998

[54] REINFORCED EXPANDABLE FOLDERS

[75] Inventors: Duane Christensen, Hastings, Minn.; Theodore V. Kachel, Purchase, N.Y.; Jonathan B. Rivlin, East Brunswick, N.J.; Robert E. Hawes, Jr., Huntington Bay; Lee A. Boy, Staten Island, both of N.Y.; Setsuo Kanamoto, Montebello, Calif.; Eric R. Aaldenberg, Bayside; John Heffernan, Setauket, both of N.Y.; James J. Lynch, Berkley Heights, N.J.; Cheryl Dellacroce-Steinberg, Jericho, N.Y.

[73] Assignee: Smead Manufacturing Company, Hastings, Minn.

[21] Appl. No.: 483,925

[22] Filed: Jun. 7, 1995

Related U.S. Application Data

[60] Division of Ser. No. 259,356, Jun. 13, 1994, abandoned, which is a continuation-in-part of Ser. No. 867,952, Apr. 13, 1992, abandoned, which is a continuation-in-part of Ser. No. 748,291, Aug. 21, 1991, Pat. No. 5,161,731, and Ser. No. 769,001, Sep. 30, 1991, Pat. No. 5,261,636, which is a continuation of Ser. No. 483,094, Feb. 21, 1990, Pat. No. 5,066,045.

[51] Int. Cl.$^6$ .............................. B32B 31/04; B31F 5/04

[52] U.S. Cl. .......................... 493/210; 493/243; 493/254; 493/918; 493/947

[58] Field of Search .................................. 493/56, 79, 80, 493/152, 352, 210, 243, 244, 254, 907, 908, 918, 947

[56] References Cited

U.S. PATENT DOCUMENTS

| | | | |
|---|---|---|---|
| 282,275 | 7/1883 | Cooke | 229/72 X |
| 325,676 | 9/1885 | Jenkins | 229/72 X |
| 510,350 | 12/1893 | Lochmann | 229/72 X |
| 574,974 | 2/1897 | Wiley . | |
| 821,019 | 5/1906 | Cooke . | |

(List continued on next page.)

FOREIGN PATENT DOCUMENTS

| | | | |
|---|---|---|---|
| 1216486 | 1/1987 | Canada . | |
| 0001167 | 3/1979 | European Pat. Off. . | |
| 2278500 | 2/1976 | France . | |
| 2300685 | 9/1976 | France . | |
| 2477504 | 9/1981 | France . | |
| 2623749 | 6/1989 | France . | |
| 891985 | 10/1953 | Germany . | |
| 3009430 | 9/1981 | Germany . | |
| 3047230 | 7/1982 | Germany . | |
| 141053 | 9/1930 | Switzerland . | |
| 0006433 | 2/1912 | United Kingdom . | |
| 926225 | 1/1935 | United Kingdom | 229/72 |
| 1123130 | 8/1968 | United Kingdom . | |

OTHER PUBLICATIONS

"WIMPI" brochure, Smead Manufacturing Co.

"New Products" brochure, Merchandise bulletin No. 92–4 (Apr. 1992), Smead Manufacturing Co.

"We've built a strong case for protecting your files.", Smead Manufacturing Co.

"Super Tuff Pocket" No. 73380, Smead Manufacturing Co.

*Primary Examiner*—Joseph J. Hail, III
*Assistant Examiner*—Christopher W. Day
*Attorney, Agent, or Firm*—Merchant, Gould, Smith, Edell, Welter & Schmidt, P.A.

[57] ABSTRACT

An expandable folder is provided which includes a front panel member, a rear panel member, and an expandable gusset which connects the panel members and forms the bottom and sides of the folder. Reinforcing means are provided upon critical or highly stressed locations to enhance the durability and useful life of the folder. Various types of reinforcement are provided about and, preferably, over the top of the gusset. The end portions of the gussets along the sides and, where applicable, the bottom, preferably have a width which is at least twice the width of the gusset folds. The outer surfaces of the inner front and rear panel members are also reinforced to strengthen the folder at least in the areas where the gusset is attached, and, for best results, on the entire outer surfaces of the panels.

4 Claims, 17 Drawing Sheets

U.S. PATENT DOCUMENTS

| | | |
|---|---|---|
| 867,789 | 10/1907 | Bushnell, Jr. . |
| 975,792 | 11/1910 | Pittman . |
| 1,116,383 | 11/1914 | Case . |
| 1,150,034 | 8/1915 | Hub . |
| 1,273,960 | 7/1918 | Wagemaker . |
| 1,455,419 | 5/1923 | Ahquist . |
| 1,585,237 | 1/1926 | Doughty . |
| 1,622,753 | 3/1927 | Ahlquist . |
| 1,634,450 | 7/1927 | Bushnell . |
| 1,650,051 | 11/1927 | Smith . |
| 1,698,841 | 1/1929 | Doughty . |
| 1,743,191 | 1/1930 | Charlton . |
| 1,745,249 | 12/1930 | Doughty . |
| 1,757,122 | 5/1930 | Hunter . |
| 1,802,429 | 4/1931 | Josephson . |
| 1,868,188 | 7/1932 | Barker . |
| 1,891,558 | 12/1932 | Rupf . |
| 1,956,325 | 4/1934 | Hart . |
| 2,052,623 | 9/1936 | Harby . |
| 2,062,436 | 12/1936 | Yawman . |
| 2,177,972 | 10/1939 | Altheimer . |
| 2,179,126 | 11/1939 | Klotz . |
| 2,188,730 | 1/1940 | Swab . |
| 2,264,295 | 12/1941 | Carter . |
| 2,291,724 | 8/1942 | Jonas . |
| 2,304,385 | 12/1942 | Sussman . |
| 2,330,402 | 9/1943 | Winokar . |
| 2,460,909 | 2/1949 | Shaffer . |
| 2,507,659 | 5/1950 | Zalkind . |
| 2,519,405 | 8/1950 | Schwinger . |
| 2,797,801 | 7/1957 | Bishop . |
| 2,893,144 | 7/1959 | Cunningham . |
| 3,063,619 | 11/1962 | Rhoten . |
| 3,073,508 | 1/1963 | Hiersteiner . |
| 3,198,420 | 8/1965 | Hiersteiner . |
| 3,238,947 | 3/1966 | Churnick . |
| 3,245,162 | 4/1966 | McElroy . |
| 3,245,859 | 4/1966 | Busk . |
| 3,425,145 | 2/1969 | Newton . |
| 3,444,635 | 5/1969 | Setzler . |
| 3,552,640 | 1/1971 | Young . |
| 3,586,160 | 6/1971 | Heimann . |
| 3,691,662 | 9/1972 | Cunningham . |
| 3,747,242 | 7/1973 | Heimann . |
| 3,779,393 | 12/1973 | Grundell . |
| 3,780,460 | 12/1973 | Hurt . |
| 3,801,408 | 4/1974 | Kuring et al. . |
| 3,805,426 | 4/1974 | Cunningham . |
| 3,863,998 | 2/1975 | Grundell . |
| 3,891,070 | 6/1975 | Montanari . |
| 3,933,294 | 1/1976 | Meenan et al. . |
| 3,937,493 | 2/1976 | Fasbender . |
| 3,978,191 | 8/1976 | Allen et al. . |
| 4,031,646 | 6/1977 | de Nouel . |
| 4,050,719 | 9/1977 | Cunningham . |
| 4,053,057 | 10/1977 | Snowden . |
| 4,109,850 | 8/1978 | Meenan et al. . |
| 4,175,476 | 11/1979 | Kidd . |
| 4,204,639 | 5/1980 | Barber et al. . |
| 4,240,848 | 12/1980 | Barber . |
| 4,274,577 | 6/1981 | Walsh . |
| 4,284,227 | 8/1981 | Corey . |
| 4,329,191 | 5/1982 | Barber . |
| 4,400,107 | 8/1983 | Pitts . |
| 4,486,261 | 12/1984 | Koller et al. . |
| 4,523,776 | 6/1985 | Barber . |
| 4,580,815 | 4/1986 | Barber . |
| 4,588,463 | 5/1986 | Barber et al. . |
| 4,730,727 | 3/1988 | Petroff . |
| 4,749,121 | 6/1988 | Barber et al. . |
| 4,806,397 | 2/1989 | Horwitz . |
| 4,830,268 | 5/1989 | Pitts . |
| 4,867,319 | 9/1989 | Arner et al. . |
| 4,958,728 | 9/1990 | Effendi . |
| 4,966,639 | 10/1990 | Pfeffer et al. . |
| 4,971,361 | 11/1990 | Whiting . |
| 5,025,979 | 6/1991 | Dellacroce . |

REINFORCED EXPANDABLE FOLDERS

CROSS REFERENCE TO RELATED APPLICATIONS

The present application is a divisional of U.S. patent application Ser. No. 08/259,356, now abandoned, filed Jun. 13, 1994, which is a continuation-in-part of U.S. patent application Ser. No. 07/867,952, filed on Apr. 13, 1992, now abandoned, which is a continuation-in-part of U.S. patent application Ser. No. 07/748,291, now U.S. Pat. No. 5,161, 731, filed Aug. 21, 1991, and a continuation-in-part of U.S. patent application Ser. No. 07/769,001, filed Sep. 30, 1991, now U.S. Pat. No. 5,261,636, which is a continuation of application Ser. No. 07/483,094, filed Feb. 21, 1990, now U.S. Pat. No. 5,066,045.

TECHNICAL FIELD

The invention relates to paper office supplies, and, in particular, to a reinforced expandable folder having increased strength and durability.

BACKGROUND OF THE INVENTION

Expandable folders are a necessary tool in the modern office or business and are also commonly used in home and schools. These folders are typically constructed of rectangular front and rear panel members having accordion-like folds along the bottom and sides, commonly called gussets, which allow the folder to expand from front to back. The folders are shipped and stored in their compact state. When put into use, the gussets allow the folder to expand gradually as the folder becomes filled with documents, paper, or other items.

A typical five piece construction is used for many expandable folders. This construction includes first front and rear panel members and a combination side and bottom gusset attached thereto, with second front and rear panel members attached to the first front and rear panel members, respectively. Typically, the gusset ends are secured between the first and second panel members.

Expandable folders are often filled (or overfilled) with documents until the gussets are completely extended and no additional documents can be placed in the folder. Utilizing an expandable folder in this manner, however, can lead to premature failure due to tearing at certain critical or highly stressed locations. These critical locations are most commonly at the points of intersection of the gusset with the front and rear panel members, at the corners of the folder, along the top edge of the gusset, and in the gusset itself.

Fully expanded folders usually tear at the point of intersection of the gusset with the front and rear panel members because when these expanded folders are subsequently looked through to locate a particular document, the searcher often tries to expand the folder further in order to see and retrieve the documents stored therein. Also, when the retrieved document must be returned to the folder, the searcher will again stretch the folder to make room so that the document may be easily placed therein. However, because the gusset is already fully expanded, the only way for the folder to expand further is for the folder to tear at the point where the gussets are joined to the front an rear panel members of the folder.

A fully expanded folder is also relatively heavy, and this weight contributes to failure of the folder in variety of ways. For instance, the folders are often picked up by only the front or rear panel member, which causes the panel member to completely tear away from the gusset. Further, when a fully expanded folder is repeatedly placed on a desk or tabletop, the rubbing of the corners, sides and bottom of the folder on the tabletop surface causes these areas of the folder to fray or wear away. This fraying and wearing away detracts from the neat appearance the folders should have, further weakens the folder and can cause the loss of small items stored therein. Finally, when a full folder is dropped, the folder will burst or split along the seam between the gusset and front or rear panel members, scattering the folder or contents around the place of impact.

Expandable folders are also normally stored on shelves with their front and rear faces perpendicular to the length of the shelf. When these folders are retrieved, fingers are usually placed over the top edge of the gusset so that the folder can be pulled off the shelf. However, because the fully expanded folder is relatively heavy, pulling the folder in this manner often leads to separation of the gusset from the front and rear panel members. Further, the fingers usually pull the folder from the same place on the gusset over and over again. Over time, dirt and sweat will accumulate on the gusset, thereby fraying and weakening the gusset and causing the gusset to unexpectedly tear when the folder is retrieved.

These folders often become wet during use, either by being exposed to rain or snow during transport from one location to another, or when water or beverages such as coffee, tea or soda are accidentally spilled on them, or due to moisture in the air when the folder is stored. When these folders become moist or wet, they weaken considerably and are very susceptible to tearing. Further, the wet folders become deformed, weakened and deteriorate rapidly when they become dry, and are also very susceptible to tearing in this condition.

Finally, these folders are often identified by pressure-sensitive adhesive labels attached to the front or rear panel member. However, when it is desired to remove these labels, the folders often become disfigured due to the inability to separate the adhesive on the label from the fibers in the panel members. Thus, these folders are often discarded simply because they no longer have a neat appearance.

The inventors have identified the above problems and have established that a need exists for an expandable folder that solves such problems. In particular, there is a need for an expandable folder of increased strength that is durable, will not fail when it is filled to capacity, is resistant to liquids, and which will maintain a neat, sturdy appearance.

SUMMARY OF THE INVENTION

The present invention provides an expandable folder which includes reinforcing material to increase the strength and durability of the folder. This folder comprises front and rear panel members, each having outer and inner surfaces, and expandable gusset means including bottom and side gussets for connecting peripheral portions of the front and rear panel members together such that the inner surfaces of the panel members face each other. The gussets and panel members form the inner boundaries of the folder which define a cavity for receiving file materials.

In one embodiment, reinforcing material is applied across a portion of each side gusset of the folder and onto a portion of the front and rear panels to strengthen and increase the connection of each side gusset to the panel members and the durability of the folder. The gusset means comprises a sheet having an expandable portion which has a plurality of accordion-like folds, and terminal end portions which are wider than the folds to provide additional strength to its connection with the panel members.

In another embodiment, the side gusset members include a top edge, and the reinforcing material is applied in the form of a band to the side gusset members at the top edge thereof. The reinforcing material may be affixed to the outer surface of the side gussets and onto the outer surfaces of the panel members of the folder, preferably in the form of a band which extends across the side gusset members and the outer surfaces of the panel members to completely engage the outside perimeter of the entire folder. If desired, the reinforcing material can completely cover the gusset member and portions of the panel members.

Alternatively, the reinforcing material may be affixed to the inner surface of the side gusset member and onto at least a portion of the inner surfaces of the panel members. Again, the reinforcing material may be applied in the form of a band which extends across the side gusset members and the inner surfaces of the panel members to completely engage the inside perimeter of the entire folder, or to completely cover the gusset member and portions of the panel members.

The reinforcing material may also be used in the form of reinforcing strips which are placed adjacent the top edge of the side gusset member at each connection of the side gusset member to the front and rear panel members. Preferably, a first reinforcing strip is affixed to each outer layer of the front panel member, extending at an angle over the top edge of the adjacent side gusset member and onto the inner layer of the front panel member; and a second reinforcing strip is affixed to each outer layer of the rear panel member, extending at an angle over the top edge of the adjacent side gusset member and onto the inner layer of the rear panel member. These reinforcing strips should extend onto the panel members beyond the width of the terminal ends of the gusset connected thereto. Also, these strips may extend over the side gusset members at any angle between 30 and 60 degrees.

Another aspect of the present invention relates to an expandable folder that has reinforcing means applied to the top edge of the side gusset members and onto the front and rear panel members for providing resistance against tearing of the top edge of the side gusset members as well as resistance to separation of the side gusset members from the front and rear panel members when the folder is used.

One type of such reinforcing means may be prepared by folding the top edge of each side gusset member onto itself to form a double layer of material. If desired, each folded top edge may be secured to the side gusset member with an adhesive. Alternatively, the reinforcing means may be a strip of reinforcing material which extends over the top edge of each side gusset member and onto a portion of each side thereof.

In yet another embodiment, each side gusset member comprises a multiple layer composite structure and the reinforcing means is prepared by folding the top edge of each side gusset member onto itself and, if desired, secured with an adhesive to form a double multiple layer construction.

Alternatively, the terminal end portions of each side gusset member and the applied reinforcing means described above do not have to be secured or attached to each other. In this arrangement, multiple end portions are provided at each end of the side gusset member and each may be attached to a different panel member surface. Also, more than one terminal end portion may be applied to one panel member surface.

Another embodiment of the present invention relates to reinforcing means which is applied upon the peripheral portions of the front and rear panel members, wherein the gusset member is attached to the reinforcing means to enhance the tear resistance between the connection of the gusset member an the panel members.

This reinforcing means preferably comprises a band of reinforcing material which is applied to a portion of the sides of the outer surfaces of the front and rear panel members and is at least as wide as the terminal end portions of the gusset member. Advantageously, the reinforcing means may also be a strip of reinforcing material on each panel member which extends from the bottom to a location above the point of attachment of the gusset member, and, if desired, to substantially cover the entire outer surface of each panel member.

For the preceding embodiments, the reinforcing material preferably comprises a thermoplastic film, a thermoplastic fabric or a thermoplastic film/paper composite.

Another expandable folder has an integral front panel member, bottom gusset and rear panel member and is formed from a single blank of material. Thus, separate side gussets are provided for attachment to the front and rear panel members to form the folder. The single blank of material and the side gussets may each be formed of paper, a thermoplastic film, a thermoplastic fabric or a thermoplastic film or fabric/paper composite. If desired, the side gussets may include bottom tab members and a bottom portion for attachment to the bottom gusset, and the reinforcing means may extend from the front panel member across the bottom gusset to the rear panel member.

Yet another expandable folder in accordance with the invention is formed from components which have terminal end portions for attachment to one of the panel members or the side gusset members to strengthen and increase the connection of each side gusset to the panel members as well as the durability of the folder. Again, the front panel member, gusset, rear panel member and terminal portions may be integral and formed from a single blank of material. These terminal portions can extend from side gussets and be connected to the panel members, or can extend from a panel member and across an adjacent side gusset for attachment to the other panel member. Advantageously, four terminal portions are present, two of which extend from the side gussets and are connected to the panel members, and two of which extend from a panel member and across an adjacent side gusset for attachment to the other panel member.

A preferred expandable folder includes reinforcing means in the form of a sheet of reinforcing material which substantially covers the entire outer surface of each panel member to enhance the tear resistance of the connection of the gusset member to the panel members. Additional panel members are secured to each reinforcing means on the outer surfaces of the panel members to retain the gusset attachment therebetween.

Advantageously, the front panel member and additional panel members are made of red wallet material, the rear panel member is made of manilla paper, the gusset is made of plastic film reinforced paper, the reinforcing means comprises a thermoplastic film or a thermoplastic film/paper composite, and the rear panel member has a height which is greater than the front panel member for viewing the top portion thereof for purposes of viewing filing indicia which may be placed thereupon.

BRIEF DESCRIPTION OF THE DRAWINGS

The foregoing and other features of the present invention will be more readily apparent from the following detailed description and drawings of an illustrative embodiment of the invention in which.

DETAILED DESCRIPTION OF THE INVENTION

A more complete understanding of certain features of the present invention can be found in U.S. Pat. No. 5,161,731 and U.S. Pat. No. 5,066,045, the disclosure of each of which is expressly incorporated herein by reference thereto for the purpose of further describing and defining such features.

The term "expandable folder" is used herein to mean and include expandable pockets, wallets, files and jackets, with or without covers or partitions which are separate or attached to one of the panel members.

Figure 1:
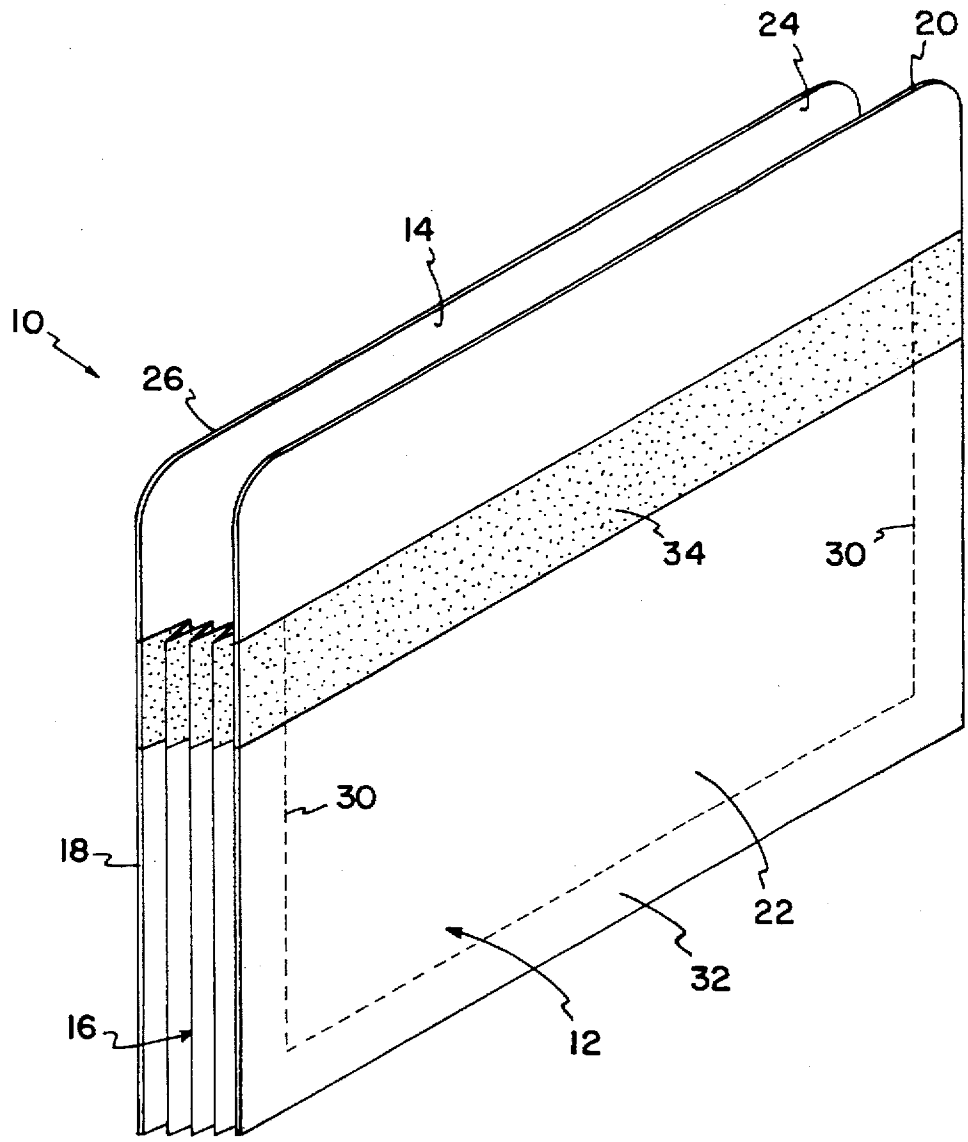
FIG. 1 is a perspective view of an expandable folder having a band of reinforcing material which extends completely around the folder.

FIG. 1 illustrates an expandable folder 10 comprising a front panel 12 and a rear panel 14. The front and rear panels 12, 14 are connected by an expandable gusset 16 which forms the bottom and the sides 18 of the folder 10. The folder 10 is open along the top to facilitate insertion of papers, documents and other items which are to be stored in the folder.

The front panel 12 comprises an inner member 20 and an outer member 22 which are cut or stamped from paper such as cardboard, manilla, red rope or red wallet and then glued, stamped or otherwise attached to one another. In addition, the material of the panel can be folded upon itself and adhered together to form both the outer and inner panel members. Similarly, the rear panel 14 comprises an inner member 24 and an outer member 26 of the same types of materials. A typical arrangement combines manilla paper for the inner member 24 of the rear panel and red wallet for the other three members, but any combinations can be made depending upon the anticipated usage of the folder 10.

The gusset 16 comprises a sheet of paper which is repeatedly folded on top of itself in a well-known manner. The folded gusset 16 has an accordion-like expansion capability that permits the folder 10 to gradually expand as it is filled with items to be stored. The paper forming the gusset 16 is of sufficient length to extend around the bottom and sides of the folder 10, and the width of the paper is selected in accordance with the desired expanded thickness of the folder.

The side portions 18 of gusset 16 have end portions 30 (shown in phantom) which are approximately the same size as the gusset folds. Similarly, the bottom portion of gusset 16 has end portions 32 (also shown in phantom) which are essentially the same size. Alternatively, these end portions 30, 32 may be at least about twice as wide as the gusset folds, or at least ⅞ inch wide, whichever width is greater. It is preferred to use the extended width end portions 30, 32 to increase the surface area over which the gusset 16 contacts the panel members 12, 14, thus strengthening the bond therebetween. However, gussets having end portions 30 of double width in combination with end portions 32 of standard width, i.e., as wide as the inner folds, could also be used for certain folders, since the stress on the end portions 32 of the bottom is not as great as on the end portions 30 of the gusset sides. Of course, the greatest strength joint of the gusset to the panels is when both end portions 30, 32 are of double width.

The extended or double width gusset end portions can be achieved by unfolding the last gusset fold on each end of the gusset so as to provide the required width prior to attachment to the panels. Alternatively, the extended width can be provided by allowing the unfolded end portions to be of the appropriate dimensions. The latter arrangement is preferred when plastic or polymer reinforcement is provided on the gusset, because folded plastic material has a memory which encourages the material to retain its folded shape, thus causing difficulty during the subsequent assembly and manufacture of the gusset onto the panels.

These end portions 30, 32 of the gusset 16 may be attached to the panels in a number of configurations. If desired, the end portions may be attached to the outer or inner surfaces of the panels, provided that the entire surface area of the end portion is attached to the panel. Since a typical panel includes inner and outer members, it is preferred from an aesthetic viewpoint to attach the end portions between the panel members. To do this, the end portions are positioned between the inner and outer layers of the front and rear panels 12, 14 prior to attachment of the members, such that when the members are attached in the manner described above, the end portions 30, 32 of the gusset 16 are joined to the front and rear panels 12, 14. Thus, the inner layers of the front and rear panels extend to substantially the outermost ends of the first and last gusset fold, respectively. In addition, the end portions of the gusset 16 may be provided with a suitable adhesive to increase the strength of their connection to the panels.

To reinforce the joint between the top of the gusset and the panels, a band of reinforcing material 34 is applied to the outer surfaces of the front panel 12, the side portions 18 of the gusset 16, and the rear panel 14, thus surrounding the entire folder 10. The reinforcing band 34 is positioned adjacent the top edges of the sides of the folder 10 and over the end portions 30 of the gussets attached thereto. The band 34 preferably has a width of about one inch, although other dimensions can be utilized.

The band 34 is preferably formed of a plastic material, such as TYVEK thermoplastic material (Dupont registered trademark for spun bonded olefin), which includes an adhesive thereon for attachment of the band to the panel members 12, 14 and side portions 18 of the gusset 16. Alternatively, if the TYVEK material is not adhesive-backed, the reinforcing band could be affixed to the folder 10 using a suitable glue or other adhesive. This TYVEK material is generally formed as a tape or fabric which is commonly laminated onto a substrate such as paper. In addition, other thermoplastic films or tapes could also be used to form the band 34. These films or tapes could also be adhesive-backed or affixed to the folder 10 with a suitable adhesive or glue that is applied either to the band 34 or to the folder 10. Fiberglass or other filament containing tape could also be used as the reinforcing material. Furthermore, a plastic film/paper laminate of composite, with or without an adhesive backing, can be used to form a band having even further increased strength.

As discussed above, the expandable folder 10 is typically filled to capacity or over-filled with documents and items to be stored. Often, the filled folders are stretched or expanded beyond their limits as documents are retrieved and then returned to the folder, putting stress on certain locations of the folder 10, such as where the gusset 16 is attached to the panels 12, 14, and often causing tearing at this connection. Further, when the folders are retrieved from filing drawers or shelving units, the folder 10 is often pulled by one of the panels, frequently resulting in separation of the gusset 16 from the panels 12, 14. Tearing can also result when a full folder is dropped. The presence of the reinforcing band 34 at the intersections between the gusset 16 and panel members 12, 14 strengthens the folder 10 and prevents separation of the gusset from the panel members when these types of pulling or expansion forces are applied to the folder. Thus, the present invention provides an expandable folder having increased strength and durability which will increase the life of the folder.

In another embodiment of the invention, the band of reinforcing material may be applied to the inner surfaces of the folder 10 either alone or in combination with the outer reinforcing band 34. The inner band is preferably the same width as the outer band described above and is preferably positioned adjacent the top edges of the side portions 18 of the gusset 16, across the inner layers 20, 24 of the panels 12, 14, respectively, and over the end portions 30 of the gusset 16 attached thereto. In this manner, the inner band reinforces the intersections of the side portions of the gusset 16 and panels 12, 14 at locations where pulling and expansion forces are most often applied to the folder, thus providing additional strength and durability at these locations.

The inner reinforcing band is also preferably formed of a strip of TYVEK material which has an adhesive backing and is applied to the front panel 12, rear panel 14, and side portions of the gusset 16. As discussed above, other suitable reinforcing materials with or without adhesive backing may also be used as this band.

Figure 2:
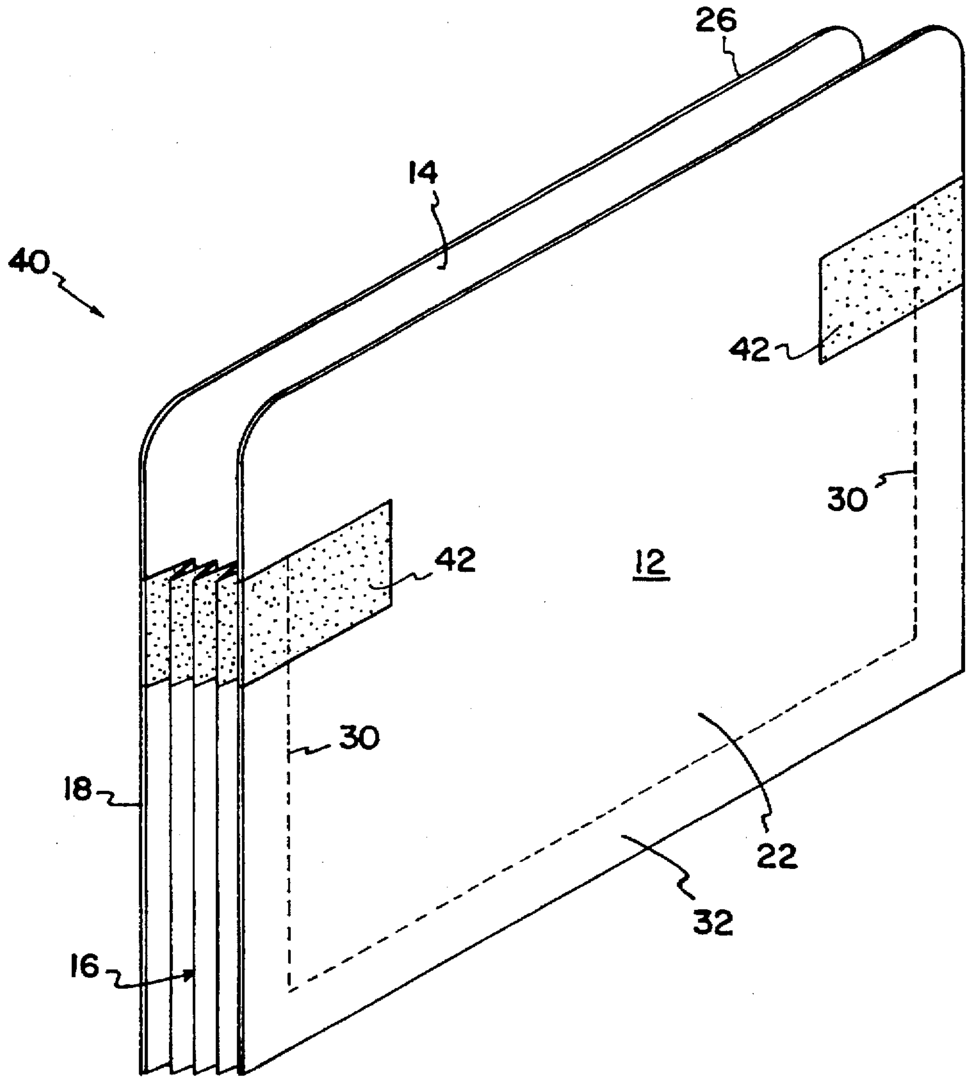
FIG. 2 is a perspective view of an expandable folder having reinforcing strips which are positioned across the gusset at each side of the folder.

FIG. 2 illustrates another embodiment of a reinforced expandable folder 40 wherein like parts have been numbered correspondingly. In this folder 40, two separate reinforcing bands 42 are provided to strengthen the locations where the gusset 16 is attached to the front and rear panels 12, 14 of the folder. Each band 42 is made of the same material and has the same width as the other bands discussed above, but these bands 42 are applied only across a portion of the outer layer 26 of the rear panel 14, the side portion 18 of the gusset 16, and a portion of the outer layer 22 of the front panel 12. The reinforcing strips 42 are positioned on the outer surfaces 22, 26 of the front and rear panel 12, 14, respectively, to extend beyond the width of the terminal ends 30 of the gussets 16 which are attached thereto. In this manner, the reinforcing bands 42 provide additional strength and support when pulling and expanding forces are applied to the gussets 16 at its intersection with the panel members 12, 14. Thus, the bands 42 prevent tearing and separation of the gusset 16 from the panel members 12, 14 and increase the durability and longevity of the folder.

If desired, the ends of these bands 42 can be placed between the panel members for aesthetic purposes. In this embodiment, the gusset would be attached only to the inner panel members prior to attachment of the bands 42 and the outer panel members. Alternatively, these bands 42 can be attached to the outer panel members prior to the attachment of the gusset thereto, followed by the attachment of the inner panels to the outer panels. A third aspect contemplates the attachment of the bands 42 to the inner panel members after the gusset and panels are attached together. In this arrangement, the bands 42 would extend to the top of the gusset to provide resistance against tearing at that location.

Yet another embodiment of an expandable folder 50 is illustrated in FIG. 3 where again like parts have been numbered correspondingly. The top corners 52 of expandable folder 50 where the top edge of the gusset 16 is connected to the panel members 12, 14 has been found to be a highly stressed location which is prone to failure by tearing. Thus, folder 50 includes reinforcing material applied to these top corners 52 to increase the tearing resistance at these locations. The reinforcing material is applied in four bands or strips preferably about one to two inches in width which are placed over the corner junctions 52 at an angle of about 45 degrees. Placing these bands at an angle provides additional resistance against vertical separation forces, as well as similar resistance to horizontal forces, compared to the horizontally applied bands of FIGS. 1–2.

Preferable, a first pair of bands 54 extends over the top corners of the side portions 18 of the gusset 16 adjacent the front panel 12. Each band 54 is applied to the outer surface 22 of the front panel 12 and extends diagonally over the corner intersection 52 of the gusset 16 for attachment to the inner surface 20 of the panel. Similarly, a second pair of bands 56 extends over the top corners 52 adjacent the rear panel 14, wherein each band is applied to the outer surface 26 of the rear panel 14 and extends diagonally over the top corners 52 for attachment to the inner surface 24 of the rear panel. These bands can be placed at any desired angle between 30 and 60 degrees.

The bands 54, 56 are applied to both the inner and outer surfaces of the panels 12, 14 such that the reinforcing material extends beyond the width of the terminal ends 30 of the gusset 16 connected thereto. The extension of the reinforcing material past this location provides additional reinforcement and strength when pulling and expansion forces are applied to the gusset 16, advantageously increasing the durability and longevity of the expandable folder 50.

When inner and outer panel members are utilized, bands 54, 56 can be applied after the gusset is attached to the outer surface of the inner panel members and prior to attachment of the outer panel members thereto. Thus, after connection of the outer panel members, bands 54, 56 would be visible only on the inside of the folder. If desired, these visible portions of bands 54, 56 can be covered with inner strips which are placed along the sides of the panel members as shown in U.S. Pat. No. 5,161,731.

Alternatively, these bands 54, 56 can be attached to the outer panel members after the gusset is attached to the inside surfaces of the outer panel members. Next, the inner panel members are attached to the outer panel members to cover the gusset and bands. In this arrangement, the bands 54, 56 would be visible only on the outside of the folder. If desired, these visible portions of bands 54, 56 can be covered by the cover strips described above or by additional panel members which are secured to the outer panel members.

As in previous embodiments described herein, the reinforcing material preferably comprises TYVEK material, although other suitable reinforcing materials may be used. Again, the reinforcing material may be adhesive-backed or may be attached to the folder with a glue or adhesive which is applied to the bands or the folder. The most preferred material for this band is a TYVEK material reinforced paper that includes an adhesive backing.

Figure 3:
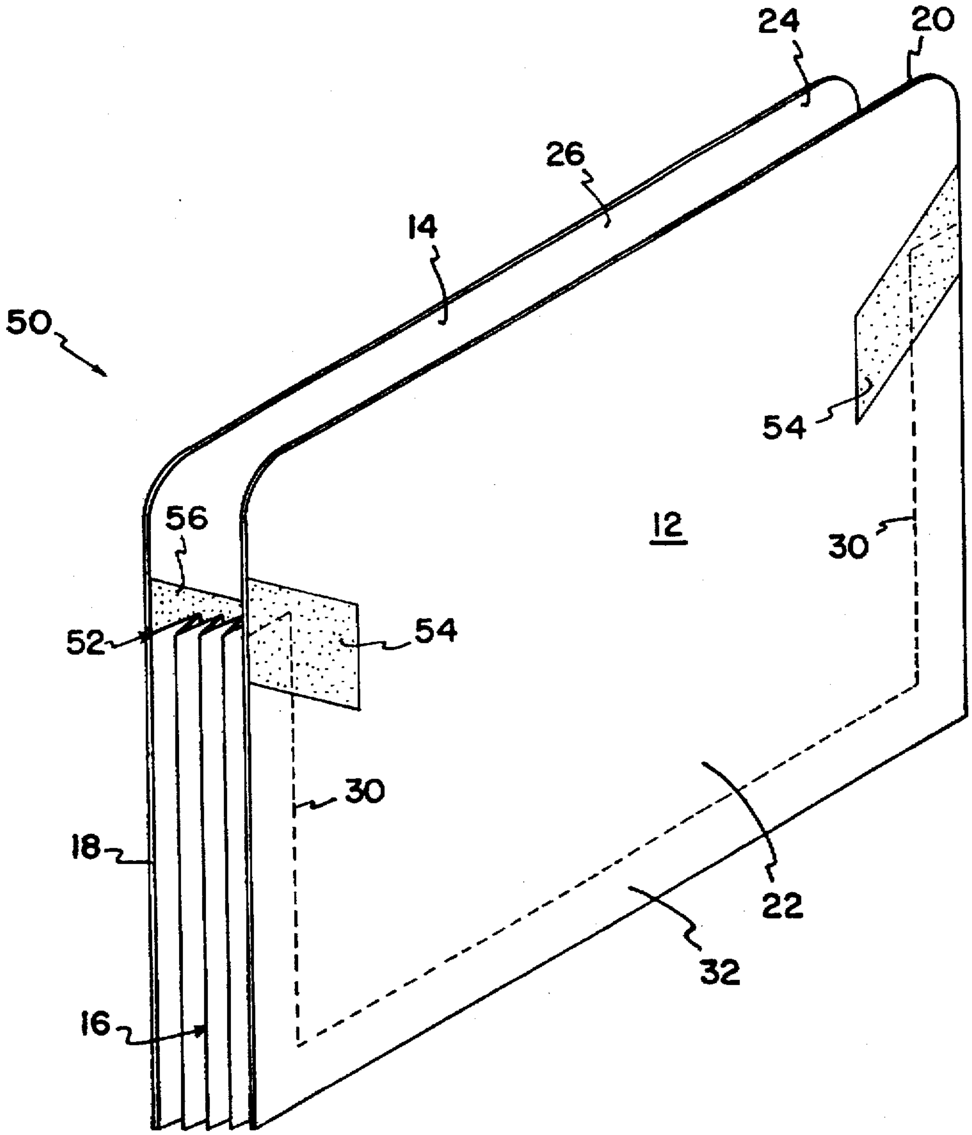
FIG. 3 is a perspective view of an expandable folder having reinforcing strips positioned diagonally over the top edge of the gusset where attached to the front and rear panel members.

All embodiments of the invention of FIGS. 1–3 may further include additional reinforcement at the bottom corners and on the panels at the outer and inner sides thereof, as described in U.S. Pat. No. 5,161,731.

Figure 4:
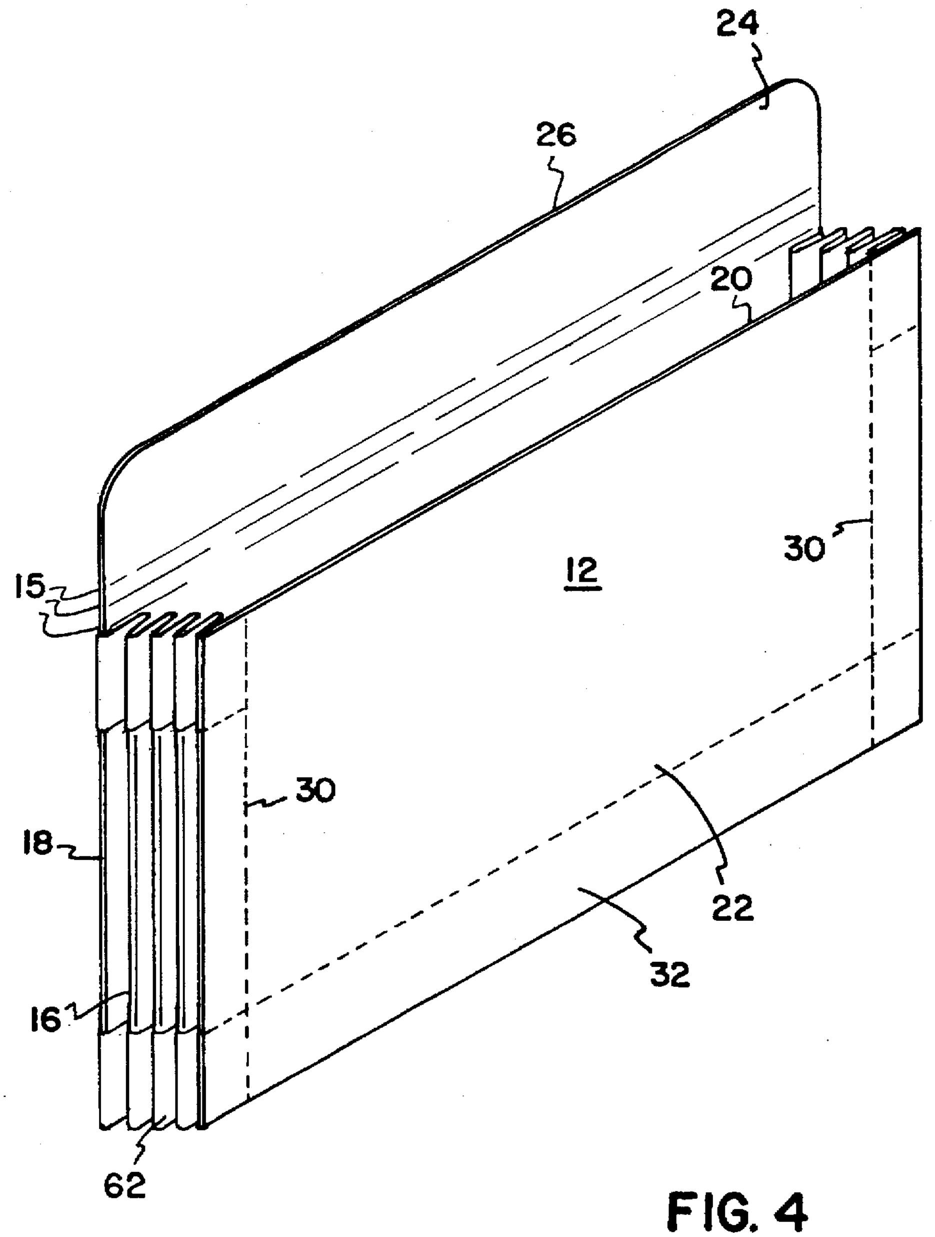
FIG. 4 is a perspective view of an expandable folder having a cover and reinforcing strips which are positioned at the top of the gusset and the corners of the folder.

FIG. 4 illustrates another folder 60 where again like parts have been numbered correspondingly. This folder includes such corner reinforcement 62 for providing additional wear and abrasion resistance to those areas of the folder. Also, the top portion of the rear panel 14 is configured to be a cover which can be used to protect the paper receiving cavity of the folder. This cover preferably has a plurality of score lines therein to conform to various expanded sizes of the folder. Also, the cover may include tie members, elastic bands or other means for securing it in a closed position on the file. If desired, this or other folders according to the present invention can also be designed to include or accomodate internal partitions or separators.

To prevent tearing of the top of the gusset and to reinforce the joint made between the sides of the gusset to the panels near the top of the gusset, various types of reinforcement can be applied to the top of the gusset, as shown in FIGS. 5–10.

Figure 5:
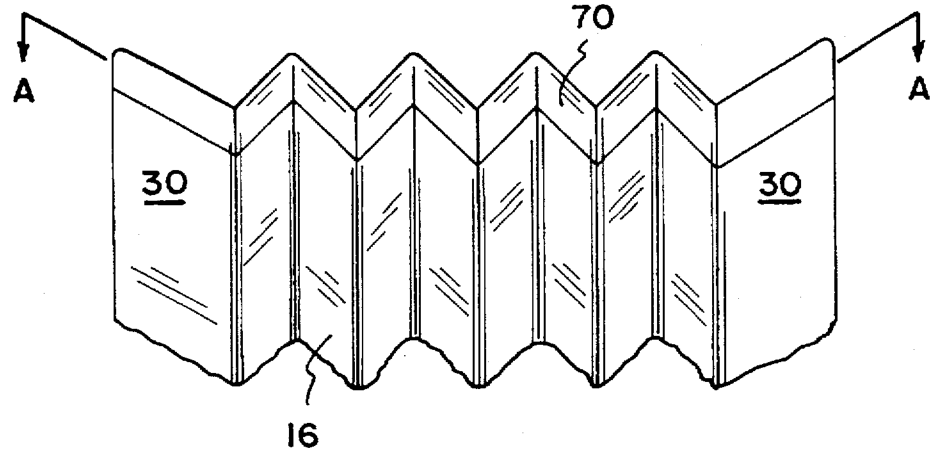

FIG. 5 shows gusset 16 before end portions 30 are attached to the panels. Reinforcement 70 is provided at the top of the gusset 16 to provide resistance to tearing or detachment from the panels. In one embodiment, the top portion of the gusset is folded over itself and secured with glue or an adhesive to provide the reinforcement 70. It is immaterial as to which direction the top portion is folded, i.e., inside or outside as shown. When the gusset is made of a single sheet of material, such as paper, the top of the gusset will then have a double layer of material which is held together by the glue and which provides increased resistance to tearing. The inner surfaces of the end portions 30 are also provided with glue or an adhesive backing on one or both sides for attachment to the panels. The reinforced gusset can be attached to the inside or outside of the panels. When inner and outer panels are used, the reinforced gusset can be attached to any surface of either panel member, although, as noted above, attachment of the gusset between the panels is commonly used.

Instead of folding the top of gusset 16 upon itself, a strip of reinforcement can be applied to one side of the gusset 16 at the top thereof. Such reinforcement may be made of a wide variety of materials, including paper, cardboard, a plastic film of polyethylene, polypropylene, TYVEK material, or the like. The plastic film may contain natural, synthetic of glass fibers or strands therein to provide further resistance to tearing or wear. The desired reinforcing material can be applied to the gusset using a suitable adhesive, which may be placed either on the reinforcement or on the gusset. Also, the reinforcing material can include an adhesive backing to facilitate attachment to the gusset. Again, a double layer is provided at the top of the gusset.

Figure 6:
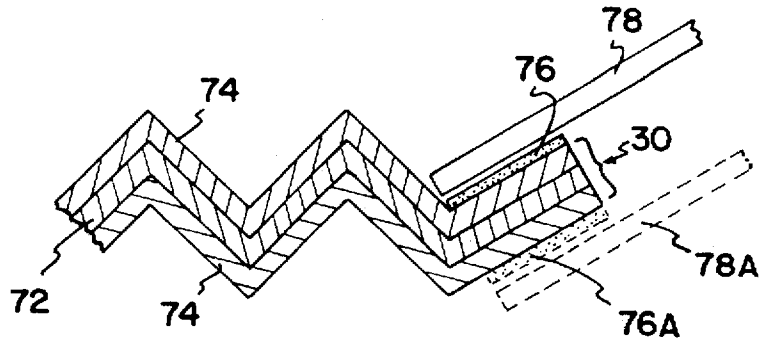
FIGS. 5–10 illustrate various gusset top reinforcements for use in the expandable folders of the invention, with FIG. 5 providing a perspective view of the top portion of a gusset and FIGS. 6–10 representing cross-sectional views of various reinforcement arrangements taken along line A—A of FIG. 5.

For a greater degree of tear resistance, the reinforcement material can be applied over the top of the gusset and onto both the inside and outside top portions thereof. A cross section of one side of the gusset of this embodiment is shown in FIG. 6, with the use of a paper gusset 72 and TYVEK film reinforcing layer 74 being illustrated. The paper gusset 72 is provided with two layers of reinforcement 74. Again, end portion 30 has a double width compared to the width of the gusset folds for a more secure attachment to the panel members. When one panel member 78 is used, end portion 30 is provided with a glue or suitable adhesive for attachment thereto. When two panel members 78, 78A are used, glue 76, 76A is provided on each side of the gusset end portion 30 for secure attachment to the panel members 78, 78A.

Figure 7:
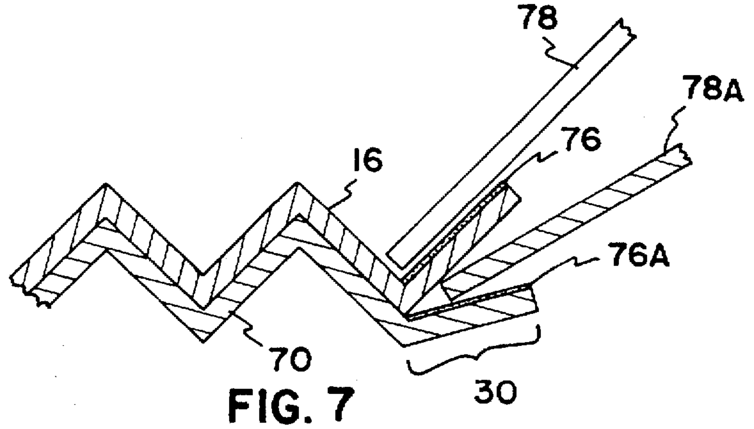

An alternative attachment arrangement for the reinforcement 70 to two panel members 78, 78A is shown in FIG. 7. In this arrangement, reinforcement 70 is not attached to end portion 30. Instead, the end portion of reinforcement 70 is attached to panel member 78A, while end portion 30 of gusset 16 is attached to panel member 78. As described above with regard to FIG. 6, glue 76, 76A or other suitable adhesive is placed upon the end portions to assist in obtaining a secure bond to the panel members 78, 78A.

Figure 8:
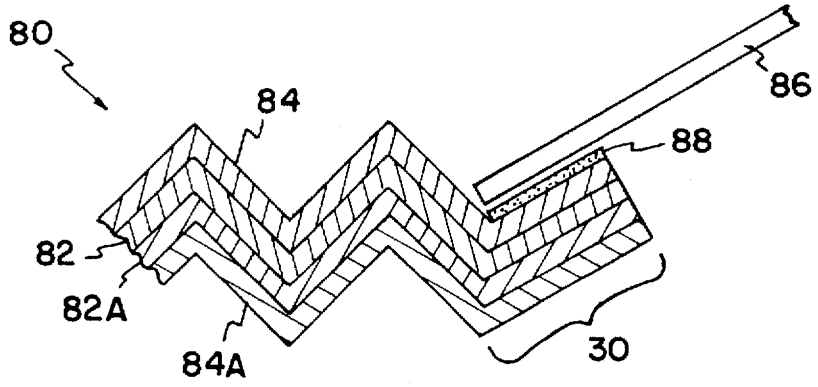
Figure 9:
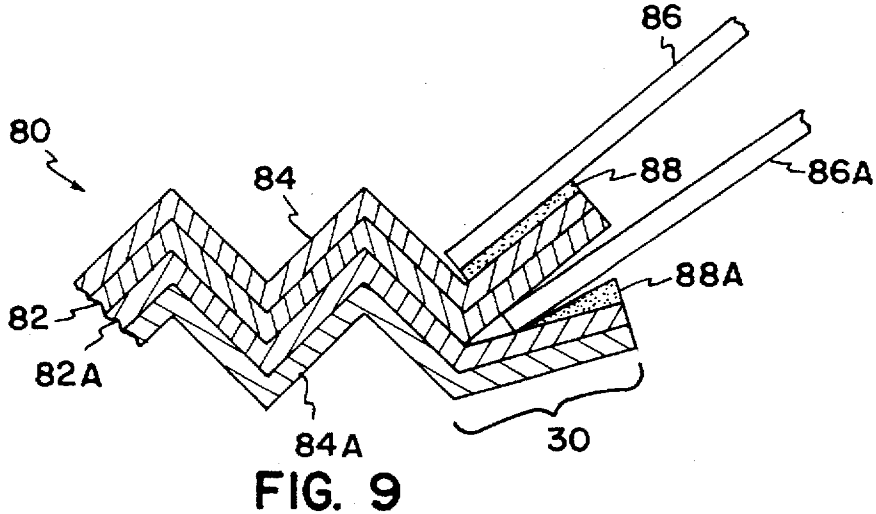
Figure 10:
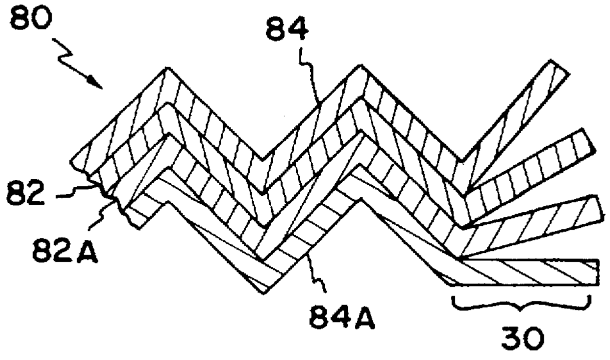

FIGS. 8–10 show another way that the top of the gusset can be reinforced. In this embodiment, the gusset is made of a plastic film reinforced paper construction, and the top of the gusset is folded upon itself and secured together. This arrangement provides for a laminate 80 having four layers at the top of the gusset, namely, paper layers 82, 82A and TYVEK material layers 84, 84A. FIG. 8 shows the end portion 30 of the laminate attached to panel member 86 by the use of adhesive 88.

An alternative attachment arrangement for this laminate 80 to two panel members 86, 86A is shown in FIG. 9. In this arrangement, the end portion 30 of the gusset member is cut to provide dual end portions, each having a TYVEK material reinforcement upon paper. This arrangement can also be achieved by not adhering the folded over portion to the other portion of the gusset. Thereafter, one end portion, made of paper 82 and film 84, is attached to panel member 86, while the other, which is made of paper 82A and film 84A, is attached to panel member 86A. As described above, glue 88, 88A or other suitable adhesive is placed upon these end portions to assist in obtaining a secure bond to the panel members 86, 86A.

FIG. 10 shows another attachment arrangement, where none of the layers 82, 82A, 84, 84A of the laminate 80 are secured to each other. This provides a great degree of versatility in connecting these layers to the panel members. For example, one preferred arrangement adheres the TYVEK materials 84, 84A to the panel members 86, 86A, respectively. Since the TYVEK material has greater strength than the paper layers, a stronger joint would be made. Depending upon the design of the folder, the TYVEK material could be applied to either side of the respective panel members. In addition, the panel members could also be sandwiched between the TYVEK materials and paper layers. Other arrangements can be devised depending on the desired configuration of the folder, and all possibilities are contemplated by this invention.

If even further attachment strength is desired for the gusset to panel member connections, additional layers of plastic material can be added to these gusset top portions. The designer can best select the appropriate layers of reinforcement for the folder depending upon the specific end uses contemplated.

It should be noted that for each of the attachment arrangements of FIGS. 5–10, the sides of the panel members extend to the first fold line of the gusset so that the entire surface area of the appropriate side of the end portion of the gusset is adhered to the panel member. As noted above, the most secure attachments, i.e., those connections having the greatest strength, are achieved when the areas of the end portions which are adhered or attached to the panel members are maximized.

Figure 11:
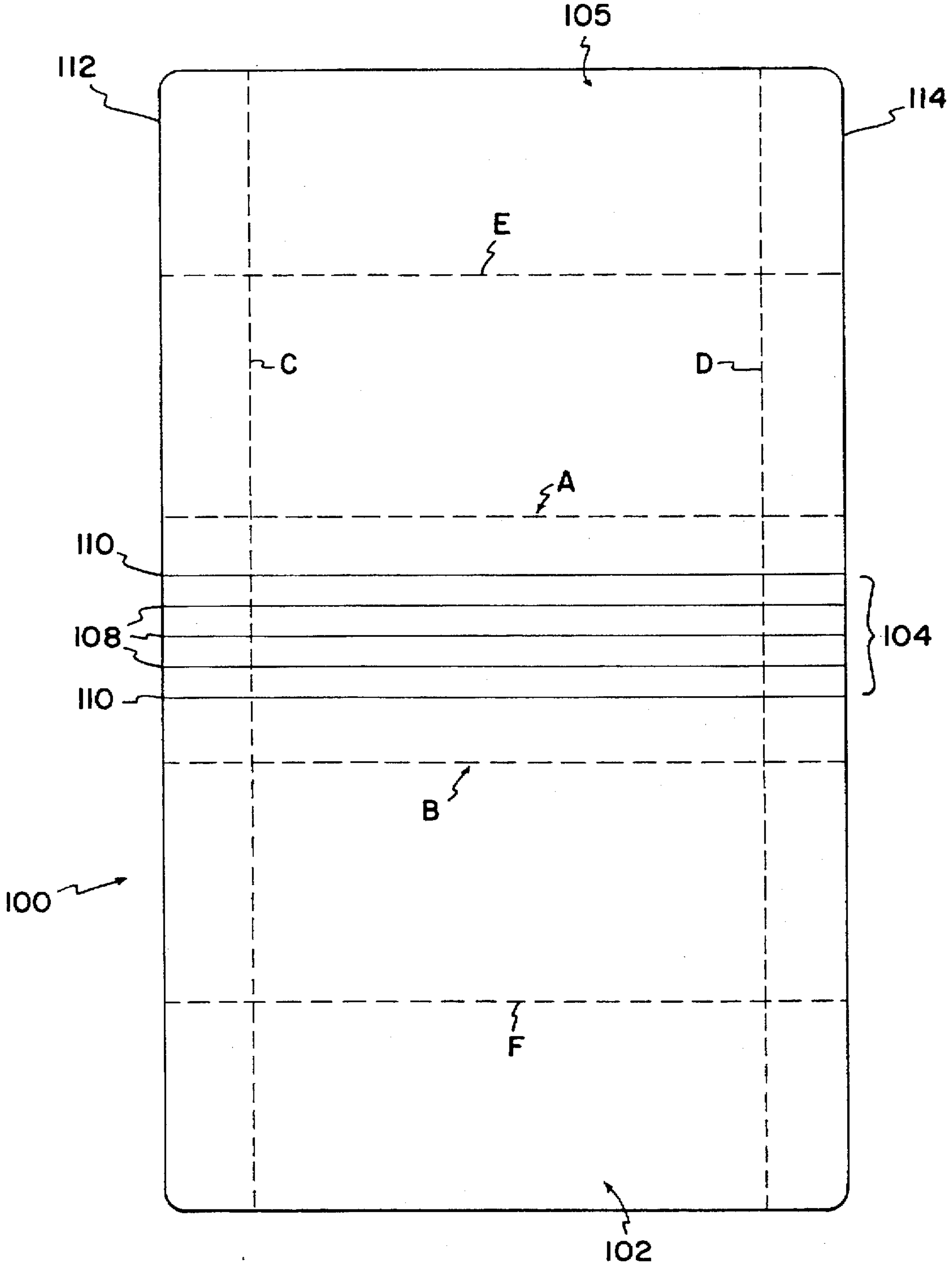
FIG. 11 is a front view of an integral front panel, bottom gusset and rear panel blank in a flat position prior to creasing the gusset folds and panel member-gusset fold lines.

Referring now to FIG. 11, there is illustrated an integral blank 100 which includes a front panel member 102, bottom gusset 104 and rear panel member 106 for forming the folder. The back side of the blank, i.e., the side which forms the outer surfaces of the folder, is shown in a flat position prior to creasing the gusset folds 108 and panel member-gusset fold lines 110. This blank 100 can be made of a single sheet of any flat, flexible material, of which paper stock of the desired weight is typical. For expandable folders requiring greater strength, the blank 100 can be made of a plastic film of polyethylene, polypropylene, TYVEK, or the like, or a plastic coated paper composite or laminate.

A reinforcing layer is provided at least on the outer surface of the gusset and onto the front and side panels to protect against frequent handling of the folder. The minimum amount of reinforcement to be applied would be a band or strip which covers the bottom gusset of the folder and the gusset-panel fold lines. This reinforcement, which is shown in FIG. 11 as the area between dotted lines A and B and the sides 112, 114 of the blank 100, strengthens and protects the folder from abrasion, such as when it is dragged along a file drawer bottom or a work station surface while carrying the weight of heavy stored papers or other file items. This strip can be easily applied by lamination onto the blank as the paper passes through the cutting machine. Alternatively, the strip can be glued to the paper, or can be applied as a liquid coating, as described herein.

The integral blank 100 of FIG. 11 has a multiplicity of horizontal depressions 108 which are folded or creased to form the bottom gusset. These gusset folds 108 are used to expand the folder to receive larger amounts or quantities of paper. Previous non-reinforced gussets were known to fail at these fold lines, with the paper tearing along the fold line during extended folding and unfolding. It was believed that the reinforcement would be advantageous in holding together the torn sections of paper as the folder deteriorates when used. However, it has been unexpectedly found that the application of reinforcement along the gusset fold lines substantially increases the useful life of the folder, because the paper does not break or tear at the fold line as it can when it is not reinforced as described herein.

It is advantageous to extend the reinforcement to the sides of the front and rear panel members in the areas where the side gussets are to be attached. These areas, shown in FIG. 11 as the area between dotted lines C and D and the sides 112, 114 of the blank 100, can be reinforced by application of strips of reinforcing material. These strips should be wider than the gusset ends which are to be attached to the panel sides. The reinforcing material is thus applied at least upon peripheral portions of the front and rear panel members but not upon the expandable portion of the gusset. Also, the area of the terminal end portions which is secured to the front and rear panel members is sufficiently large to impart to the folder a strength of at least 50 pounds when subjected to a gusset pull test, as described in U.S. Pat. No. 5,161,731 and incorporated herein.

A plurality of these strips can be applied along portions of the sides of the panels as shown, or a single strip can be applied along each side of the blank in a direction perpendicular to the bottom strip. The side strips can be placed adjacent the bottom strip, or they can overlap. The order or placement of the strips is not critical to the invention. For hand assembly of the folder, the reinforcing material along the sides and bottom can be prepared as an integral piece in the shape of an H and then applied to the blank.

Preferably, this reinforcing layer is applied as a single sheet or piece of a reinforcing material. In one embodiment, the sheet would extend from the front panel at a location above the attachment location of the side gussets, over the bottom gusset and onto the rear panel to location above the attachment location of the side gussets. This arrangement is similar to the application of the bottom reinforcement, except that a wider strip of reinforcement is utilized, i.e., one which extends between dotted lines C and D and the sides 112, 114 of the blank 100. This arrangement is advantageous because the gusset side attachment locations, which are a stress point of the folder, would also be reinforced along with the bottom gusset attachment location. Thus, the resultant folder exhibits a strength of at least 50 pounds when subjected to a front and rear panel pull test, as described in U.S. Pat. No. 5,161,731 and incorporated herein.

Alternatively, the sheet of reinforcing material can extend along and cover the entire exterior surface of the blank 100 to provide the full exterior reinforcement. In this construction, the bottom gusset, the sides of the front and rear panels where the side gussets are attached, and the top portions of the panel members where tabs, labels or other filing indicia are usually attached are all reinforced. The reinforcing layer serves to strengthen and protect the entire outer surfaces of the folder from wear associated with frequent handling. In addition, the reinforcing layer provides resistance to tearing which can occur when full and/or heavy folders are moved within the file drawer.

The reinforcing material may be made of a wide variety of materials, including paper, cardboard, a plastic film of polyethylene, polypropylene, TYVEK, or the like. The plastic film may contain natural, synthetic of glass fibers or strands therein to provide further resistance to tearing or wear. The reinforcing material can be simply laminated to the blank prior to folding the appropriate lines therein. The desired reinforcing material can also be applied to the folder using a suitable adhesive, which may be placed either on the reinforcement or on the folder. Also, the reinforcing material can include an adhesive backing to facilitate attachment to the blank. Instead of a single sheet or film, a plurality of reinforcing strips of such materials may be utilized to provide reinforcement in the desired locations. Again, these strips can be secured to the blank by lamination or use of glue or an adhesive.

The application of reinforcement by lamination is easily accomplished by applying the reinforcing material onto the paper using pressure. For this embodiment, the reinforcing material and paper may simply be passed between two rollers which supply the necessary pressure to adhere the materials to each other. It is also possible to apply the reinforcement as a liquid or solution of a polymer or resin which may be cured after application to the paper, if necessary. Other polymer or resin coatings may be used as reinforcement. Moreover, sheets of plastic reinforcement may be extruded directly onto the paper.

Furthermore, when polymeric or plastic materials are used as the reinforcing layer, the folder will be resistant to liquids, such as coffee and water, which may be spilled onto the folder in an office environment when the folder is removed from the file drawer. Yet another advantage can be achieved by using full reinforcement of a clear plastic or polymeric layer on the outermost panel members so that the panel members can be pigmented or colored more easily and inexpensively than prior folders, because the reinforcing material protects the pigmented or colored portions so that less expensive pigments, colorants, or dyes can be used. In addition, less expensive methods can be used for applying such pigments, colorants and dyes. Also, colored reinforcement can be used to impart the desired color to the folder.

Figure 12:
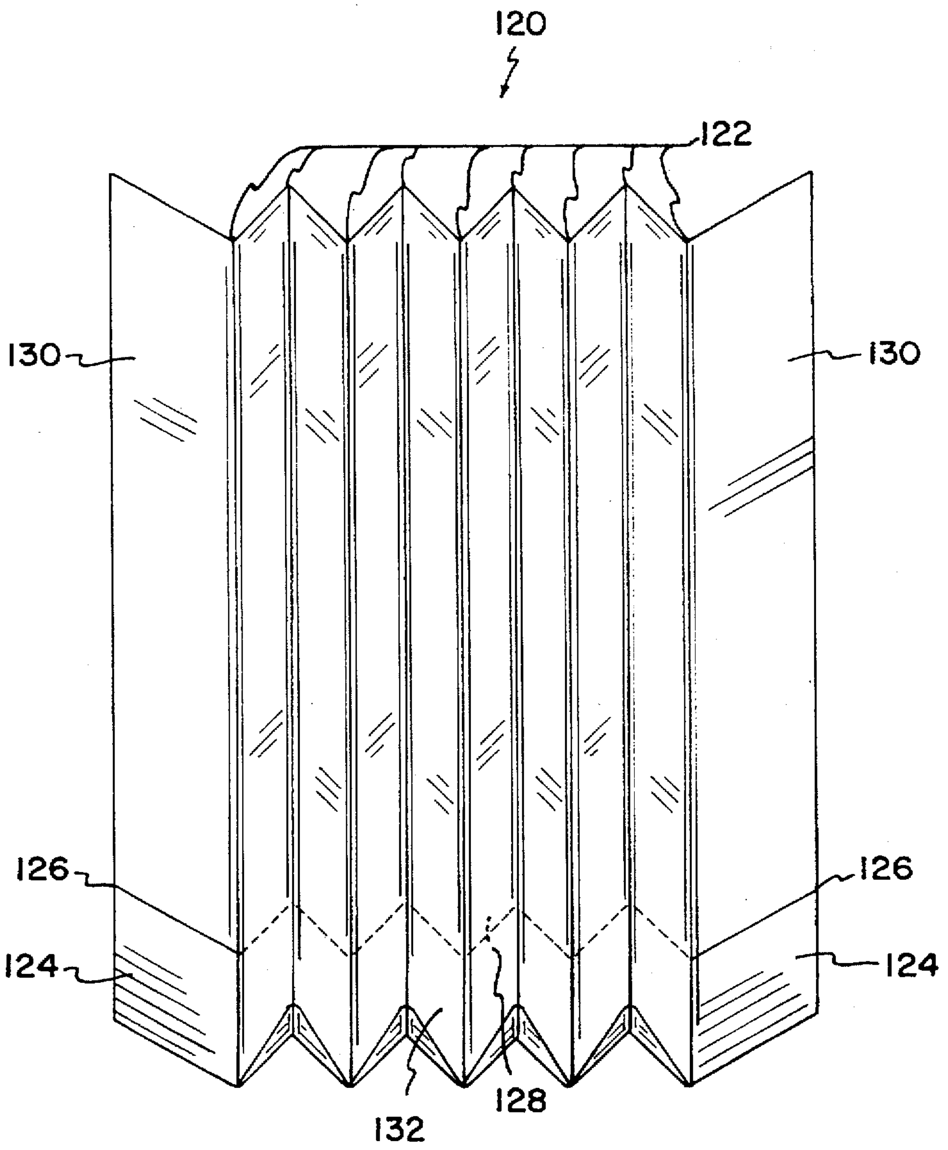
FIG. 12 illustrates a side gusset for joining the front and rear panels of the blank of FIG. 11.

FIG. 12 shows a side gusset 120 that is used with the blank 100 of FIG. 11. This gusset is made of a material which is resistant to tearing or ripping, such as a plastic film of polyethylene, polypropylene, TYVEK, or the like. The plastic film may contain natural, synthetic of glass fibers or strands therein to provide further resistance to tearing or wear. In addition, the gusset can be made of a plastic coated paper composite or laminate.

The side gusset of FIG. 12 has a multiplicity of vertical depressions 122 which are folded or creased to form the gusset folds that are used to expand the folder to receive larger amounts or quantities of paper. Previous non-reinforced gussets were prone to failure at these fold lines, due to the paper tearing along the fold line during extended expanding and collapsing. As noted above, the reinforcement of this gusset 120 substantially increases the useful life of the folder, because the paper does not break or tear at the fold line as it can when it is not reinforced as described herein.

The side gusset of FIG. 12 can also be utilized to reinforce the side gusset of a conventional folder. This gusset 120 can be attached to the panel members of any folder after the conventional gusset is attached. For a five piece folder construction, the gusset 120 can be attached to the outer surfaces of the inner panel members after attachment of the conventional gusset. Other arrangements can be devised in accordance with the teachings of the alternative embodiments of the present invention.

The end portions 130 of the side gusset can be of standard width, i.e., substantially the same width as the gusset folds, or of double width as described above for additional strength when attached to the panels. For the specific blank of FIG. 11, it is preferred to have the end portions of the side gussets attached to the outer sides of the panel members upon the reinforcement. Two of these side gussets are utilized for each blank to form the folder. These end portions 130 can be applied to the panel members using a suitable adhesive, which may be placed either on the end portions or the panel members. Also, the side gusset end portions 130 can include an adhesive backing to facilitate attachment to the sides of the panel members. Although it is preferred to apply the end portions to the outside of the panel members, they can instead be attached to the inside of the panel members for certain folder designs.

Figure 13:
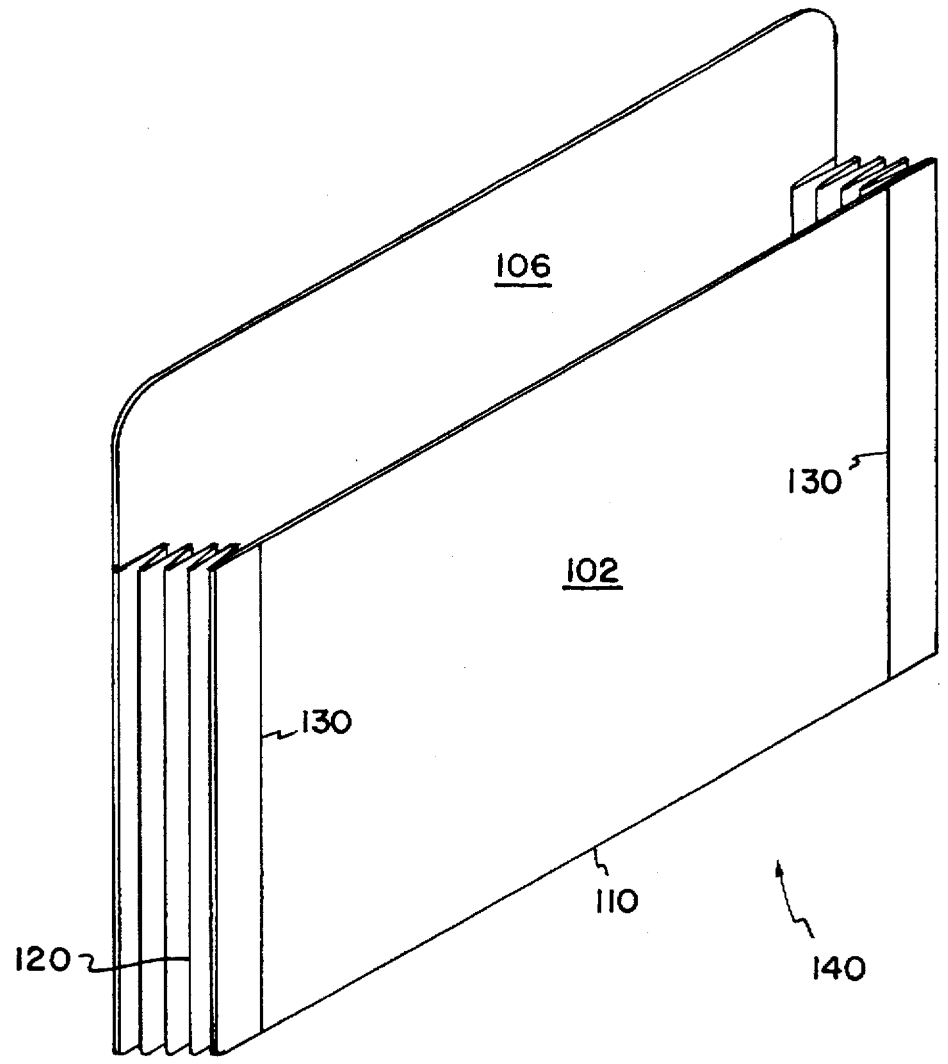
FIG. 13 is a perspective view of the integral blank of FIG. 11 which is provided with two side gussets of FIG. 12.

In one arrangement, the corners where the bottom of the side gusset meets the bottom gusset are not connected, and the folder resulting form this construction is shown as 140 in FIG. 13. Although this construction is acceptable for certain expandable folders, it is preferred to connect these components at the corner junction as well as to reinforce the resulting connection. One connection can be made by simply extending the length of the side gusset, forming tabs 124 by cutting the end portions of the side gusset along the lines 126 shown in FIG. 12, folding the side gusset bottom along the dotted line 128 which extends between the cuts, attaching the tabs to the panel members and attaching the lower portion 132 of the side gusset which extends between the tabs to the bottom gusset. As noted above, the tabs 124 and lower portion 132 of the side gusset 120 can be attached to the panel members and bottom gusset with glue or an adhesive, which may be applied to either component.

Alternatively, the corner reinforcement can be made by adding a separate piece or strip of reinforcement material which extends from the side gusset to the bottom gusset and partially onto the panel members. This corner reinforcement can be made of a material which is resistant to tearing or ripping, such as those described above for use as the side gusset. Preferably, the corner reinforcement is made of a plastic coated paper composite or laminate which and is applied with glue or an adhesive.

Figure 14:
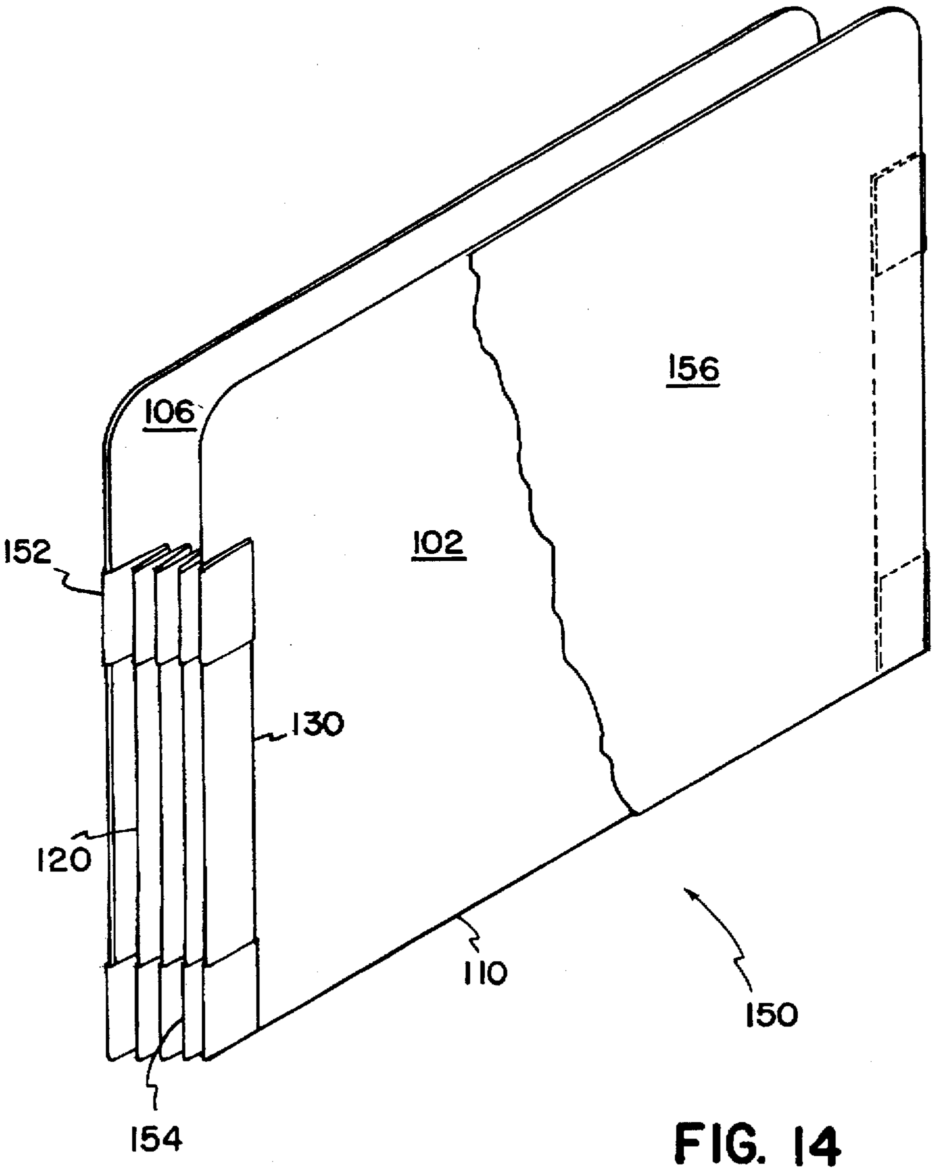
FIG. 14 illustrates the use of front and rear panel reinforcement in a five-piece expandable folder which optionally includes gusset top and gusset corner reinforcement.

The most preferred folder construction 150 for the integral blank embodiment is shown in FIG. 14 wherein like parts to those described in FIGS. 11–13 have been numbered correspondingly. In addition to the full outer reinforcement of the blank and the use of side gussets 120 which include tabs 124 for attachment to the bottom gusset, there are additional features present to further reinforce the folder and achieve an optimum service life. The tops of the side gussets are reinforced with one of the additional constructions 152 of FIGS. 5–10, while the corners of the folder are further reinforced with an additional piece of a plastic coated paper composite 154. To enhance the external appearance of the folder, additional front and rear panel members 156 are secured to the outer surfaces of panel members 102, 106 of the blank 100.

Alternatively, the cover strips as shown in U.S. Pat. No. 5,161,731, can be placed along the sides of the panel members 102, 106 of the blank over the side gusset/panel member connections rather than utilizing the additional panel members 156. In this arrangement, the cover strips can be made of one of the reinforcement materials described above to impart wear resistance to these areas of the folder.

A similar folder can be assembled using the conventional five piece folder construction, i.e., front and back panels, each having inner and outer panel members and being connected by a gusset. In this arrangement, the outer surfaces of the inner front and back panels would include a layer of plastic reinforcement covering the entire outer surfaces. The gusset is preferably made of TYVEK material laminated paper. It is most advantageous to utilize red wallet as the material for the outer panel members, as well as for the inner front panel member, with the inner rear panel member being made of manilla. The gusset end portions are attached to the reinforcement on the outer surfaces of the inner panel members before attachment of the outer panel members thereto. As noted above, additional reinforcement can be applied to the top of the gusset, the corners of the gusset, the outer surfaces of the outer panel members or the inner surfaces of the inner panel members.

Figure 16:
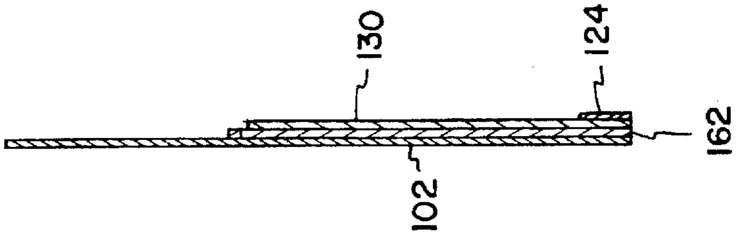
FIG. 16 is a cross-sectional view of the front panel member of the folder of FIG. 15 taken along line 16—16 thereof.
Figure 15:
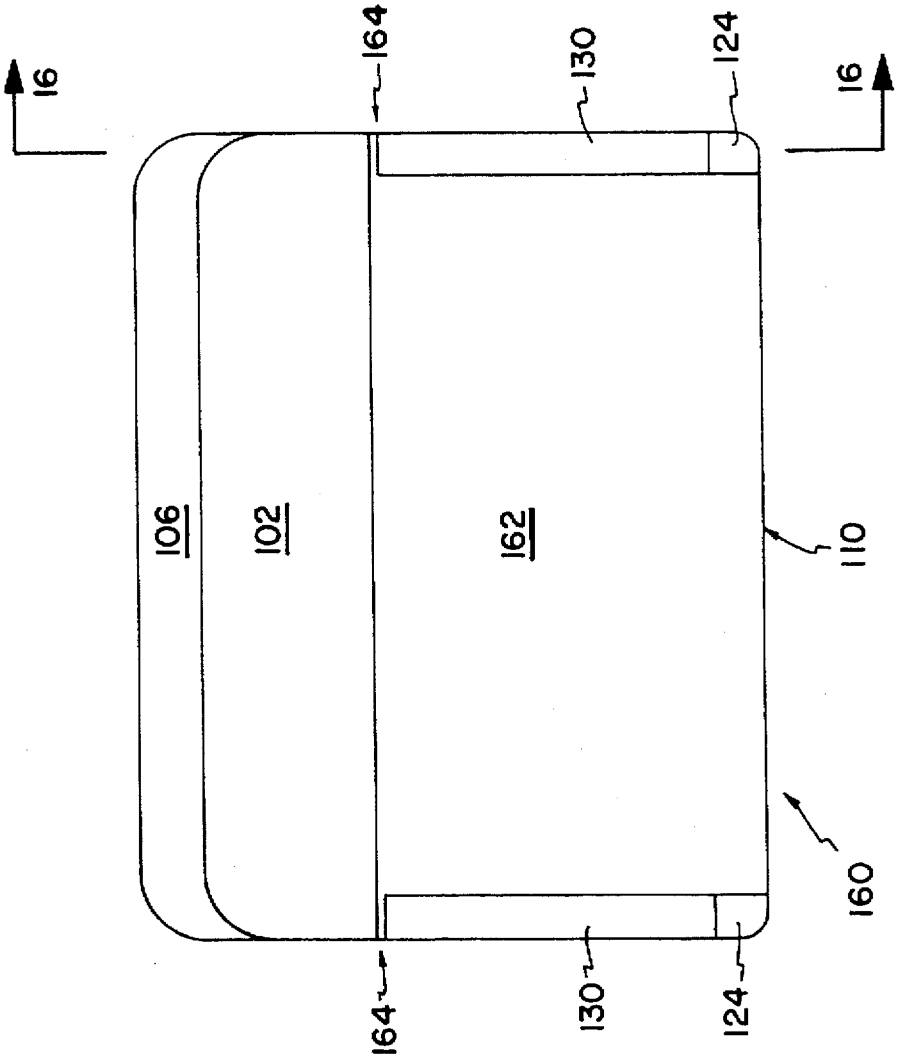
FIG. 15 is a front view of a three piece expandable folder which is made from a blank having less than full outer reinforcement.

An additional preferred expandable folder 160 is shown in FIGS. 15 and 16, wherein like parts to those described in FIGS. 11–12 have been numbered correspondingly. The outer surface reinforcement 162 of the blank extends from just above the side gusset attachment location 164 on one panel member, across the bottom gusset and onto the other panel member to a location just above where the side gusset is attached. If desired, additional panel members or cover strips can be applied to enhance the appearance of the folder by hiding the side gusset connection 130. Also, the outer surface reinforcement 162 of the blank could be extended to the top of the outer surface of rear panel member 106 to reinforce the area where labels or other filing indicia would be applied and to reduce the likelihood of crushing or bending that top portion of the rear panel member.

A similar folder can again be assembled using the conventional five piece folder construction. In this arrangement, the outer surfaces of the inner front and back panels would include a layer of plastic reinforcement covering the lower outer surfaces as shown in FIG. 15. The gusset is preferably made of TYVEK material laminated paper, with red wallet as the material of the outer panel members, as well as for the inner front panel member, and with the inner rear panel member being made of manilla. The gusset end portions are attached to the reinforcement on the outer surfaces of the inner panel members before attachment of the outer panel members thereto. As noted above, additional reinforcement can be applied to the top of the gusset, the corners of the gusset, the outer surfaces of the outer panel members or the inner surfaces of the inner panel members.

Although the preferred constructions of FIGS. 13–16 include the attachment of the side gussets to the reinforcement on the outer surface of the blank, it is also possible to make this connection on the inside surface of the blank. In this arrangement, reinforcement material is applied to the inside surface of the blank in the same manner described above for the outer areas. For this embodiment, the previously described blank would simply be reversed, i.e., the outer surface would become the inner surface.

The glues and adhesives of the present invention represent yet another advancement over the current state of the art. Generally, cold glues or adhesives are currently utilized to join the components of a standard expandable folder. Due to the structural modifications of the components of the present invention, such conventional glues are also suitable for use in assembling the present folders. For even greater improvement in the joints between components such as the gussets and panel members, however, hot melt adhesives are preferred. These adhesives effectively seal one component to the other, so that the possibility of failure due to the adhesive joint is essentially eliminated. In most instances, the strength of the joint is greater than the strength of the component.

Another advantageous manner to secure two plastic films together is with the use of a cohesive joint. Again, the strength of the joint is equal to the strength of the plastic material, so that joint failures rarely, if ever, occur without also tearing or damaging the panel members.

Furthermore, the materials utilized for the components of the folders are another novel aspect of the invention. For example, the panels, gussets and reinforcement can be made of a synthetic paper such as DURALON (a registered trademerk of Arlon, Inc.), which includes a sheet of polyester between two layers of conventional paper. The DURALON material possesses a high strength and is resistant to tearing. Also, these components can be made entirely from plastic, with the joints made by ultrasonic welding. This construction provides the highest degree of moisture and wear resistance of any of the folder materials mentioned herein. Since the components are welded together, the joint is again as strong as the materials used to make the components. Another advantage when using these improved adhesive and joining systems is that the structural reinforcements described above can be avoided since these features are built into the component materials. Also, gusset end extensions or other joint integrity maintaining means can be eliminated, since the strength of the joints with these systems is essentially equal to that of the materials of the components.

Figure 17:
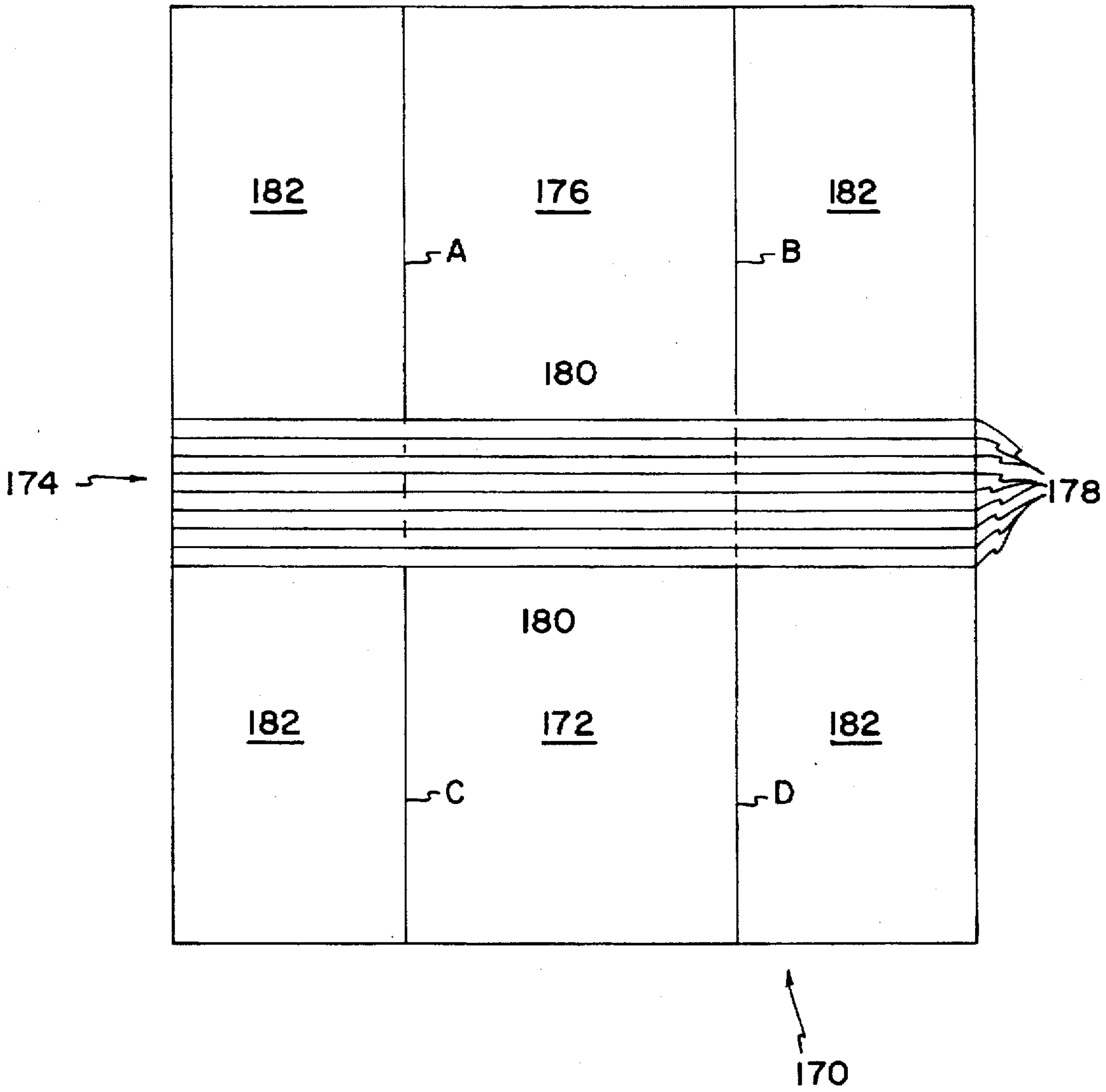
FIG. 17 is a front view of an integral front panel, bottom gusset, side gussets and rear panel blank in a flat position prior to creasing the gusset folds and panel member-gusset fold lines.

Referring now to FIG. 17, there is illustrated an integral blank 170 which includes a front panel member 172, bottom and side gusset 174 and rear panel member 176 for forming the folder. The back side of the blank, i.e., the side which forms the outer surfaces of the folder, is shown in a flat position prior to creasing the gusset folds 178 and panel member-gusset fold lines 180. This blank 170 can be made of any of the materials described above with respect to the blank 100 of FIG. 11. For expandable folders requiring the greatest strength, the blank 170 can be made of a plastic such as polyethylene, polypropylene, TYVEK, or the like, or a plastic coated paper composite or laminate.

If paper is used as the material of the blank, a reinforcing layer is provided at least on the outer surface of the gusset and onto the front and side panel members in the same manner described above with respect to the blank 100 of FIG. 11.

Preferably, the reinforcing layer extends along and covers the entire exterior surface of the blank 170 to provide the full exterior reinforcement. This allows the entire folder to be made of plastic or of a plastic film coated paper laminate or composite. With such materials, even a conventional five piece folder structure has component connections of enhanced strength and increased wear and abrasion resistance. When made out of plastic, the components can be ultrasonically welded to assemble the folder.

Figure 18:
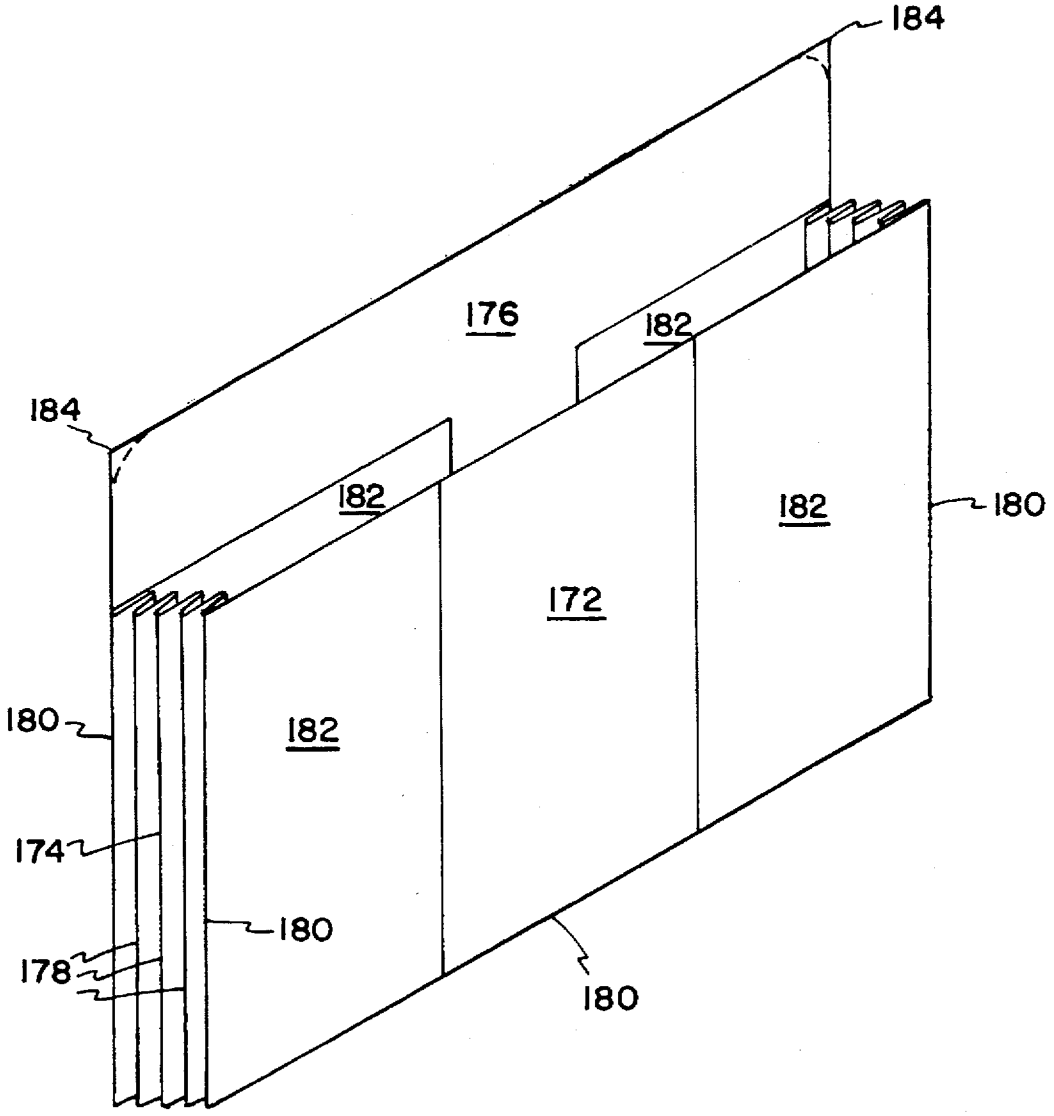
FIG. 18 is a perspective view of a folder assembled from the blank of FIG. 17.

The side gussets are formed by cutting the blank 170 along lines A, B, C, and D up to their point of intersection with lines 180. After these cuts are made, the folder is formed by making the folds in the gusset, bending the front and rear panel members upwardly by folding line 180, bending the side gussets upwardly by folding along the lines which extend between cuts A–C and B–D, respectively, and then by bending side gusset end portions 182 so that they fold either behind the panel members as shown, or alternatively in front of the panel members, along line 180. These end portions may then be secured to the panel members by glue or an adhesive, by cohesive bonding or by ultrasonic welding, depending upon the material of the blank. FIG. 18 illustrates the final folder after assembly. If desired, the corners of the rear panel member can be rounded by cutting.

Another folder configuration can be achieved by utilizing the same blank 170 of FIG. 17, but with the side gusset end portions 182 being cut out differently. In one alternative, these end portions 182 can be cut along lines 180 from the sides of the blank 170 to the junction with lines A, B, C, and D, respectively. The folder is then formed by making the folds in the gusset, bending the front and rear panel members upwardly by folding line 180, bending the side gussets upwardly by folding along the lines which extend between A–C and B–D, respectively, attaching the side gussets to the panel members by use of an adhesive or other means, bending the end portions 182 along lines A, B, C, and D, respectively, so that they extend around the outside of the side gussets, and then by attaching these end portions 182 to the outer surface panel members by glue or an adhesive, by cohesive bonding or by ultrasonic welding, depending upon the material of the blank.

In this arrangement, the side gussets are protected by two end portions, which do not have to be attached to the side gusset. Advantageously, the end portions can be provided with folds that correspond to the folds 178 of the side gusset 174. If desired, an adhesive can be used to attach the end portions to the side gusset. Since the height of the panel members is generally greater than the width of the side gusset, the end portions will be taller than the side gusset. To remedy this difference, the corners of the blank can be cut away so that the heights of both the side gusset and the end portions will be the same.

Yet another folder configuration can be achieved by utilizing the same blank 170 of FIG. 17, but with some of the side gusset end portions 182 being cut out differently. In one of these alternatives, two end portions 182 can be cut along lines A and D, while the two remaining end portions can be cut along lines 180 from the sides of the blank 170 to the junction with lines B and C, respectively. The folder is then formed by making the folds in the gusset, bending the front and rear panel members upwardly by folding line 180, bending the side gussets upwardly by folding along the lines which extend between A–C and B–D, respectively, attaching the side gussets and first end portions to the panel members by use of an adhesive or other means, bending the remaining end portions 182 along lines B and C, respectively, so that they extend around the outside of the side gussets, and then by attaching these remaining end portions 182 to the outer surface panel members by glue or an adhesive, by cohesive bonding or by ultrasonic welding, depending upon the material of the blank. In this arrangement, each side gusset is protected by one end portion, while the other end portions are attached to the outer surfaces of the panel members. As above, the end portions which protect the side gussets can be in spaced adjacent relation or attached to the side gusset. If desired, two corners of the blank can be cut away so that the heights of both the side gusset and the protective end portions will be the same.

Figure 19:
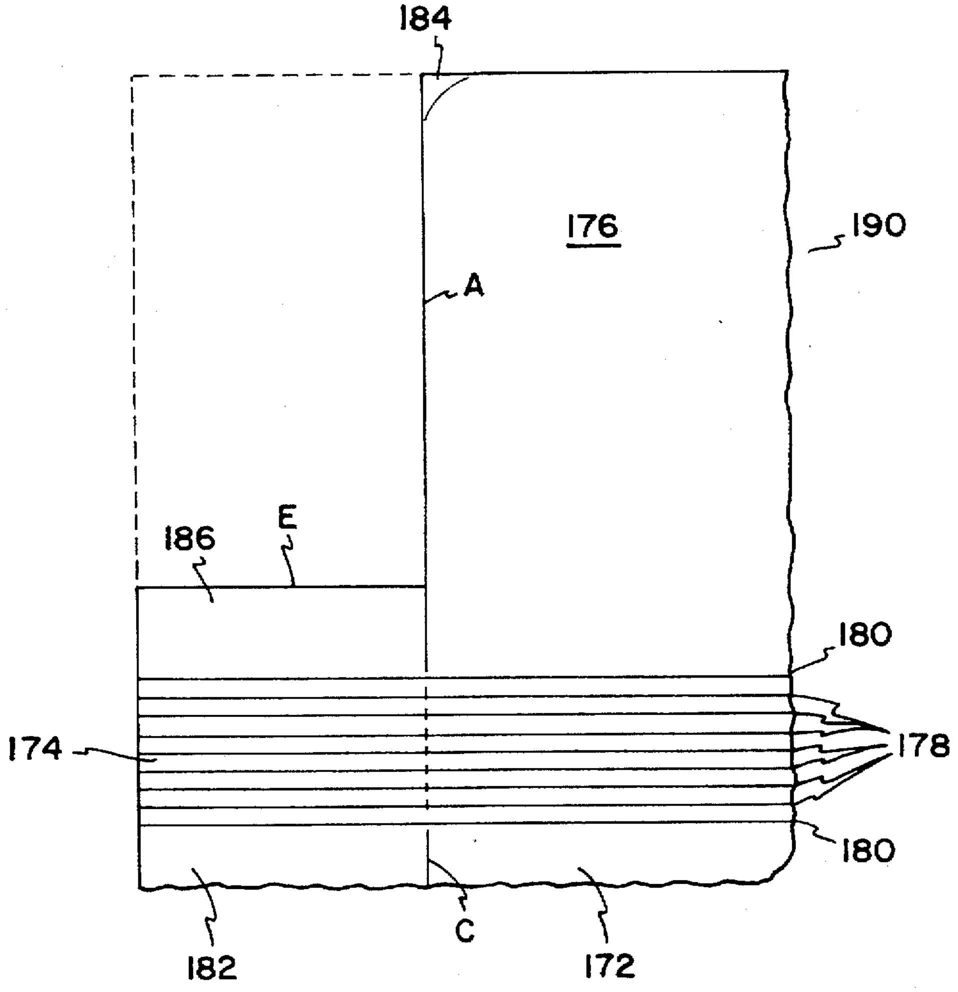
FIG. 19 is a front view of a portion of a blank which is similar to that of FIG. 17, except that the four corners of the blank are cut away.

FIG. 19 illustrates another embodiment of the one-piece folder. In this arrangement, the gusset end portions 186 are reduced in size by cutting a portion away along line E. While only one corner of the blank 190 is illustrated in FIG. 19, it is understood that each corner of the blank would be treated in the same fashion. The gusset end portions can be of standard width, i.e., substantially the same width as the gusset folds, or of double width as described above for additional strength when attached to the panel members. If an all plastic construction is used, these end portions 186 can be attached either to the outer or inner sides of the panel members. Where a plastic/paper laminate or composite is used, the gusset should be attached so that plastic is joined to plastic for optimum joint strength. The final folder for this embodiment is shown in FIG. 20.

Figure 20:
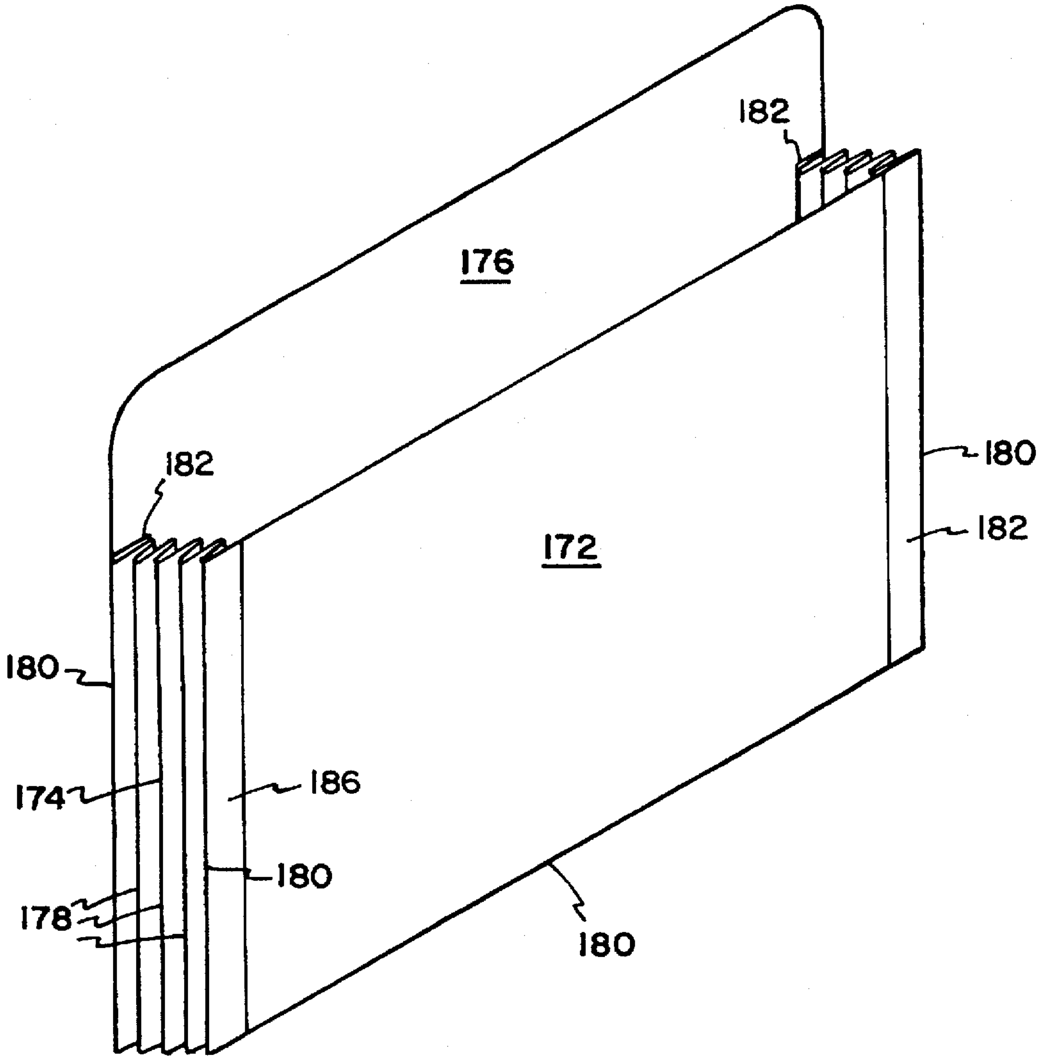
FIG. 20 is a perspective view of a folder assembled from the blank of FIG. 19.

When the folder of FIG. 20 is made from a relatively inexpensive material such as paper, the side gusset 120 of FIG. 12 can also be utilized to reinforce the side gusset 174 of the folder. This gusset 120 can be attached to the panel members after the side gusset 174 is attached. As noted above, other arrangements can be devised in accordance with the teachings of the alternative embodiments of the present invention.

For aesthetic purposes, the outer sides of the panel members of the folders of FIGS. 18 and 20, as well as the alternative embodiments of those FIGS., may be provided with the cover strips described above or by additional panel members which are secured thereto.

Expandable folders formed according to this invention provide a number of advantages to the user. Various types of reinforcement are provided about and, preferably, over the top of the gusset to prevent tearing or other failure when the folder is overstuffed with file materials. In addition, the end portions of the gussets along the sides and, where applicable, the bottom, have a width which is at least twice the width of the gusset folds to provide a more secure joint with the panel members, which joint is capable of providing increased resistance to tearing away or otherwise separating from the panel members. The outer surfaces of the inner front and rear panel members are also reinforced to strengthen the folder at least in the areas where the gusset is attached, and, for best results, on the entire outer surfaces of the panels.

If desired, the corners of the gusset may be reinforced to prevent wearing due to abrasion with file drawer or work surfaces such as would be caused by sliding the file bottom across those surfaces. It is also possible to reinforce or coat the surfaces of the outer front and rear panel members in critical areas which are subject to stress, wear or abrasion.

For an optimum construction, substantially all outer surfaces of the folder are provided with reinforcement to prevent degradation from moisture or other contaminants. Such outer reinforcement also allows less expensive pigmentation or colorants to be utilized on the paper substrate. The edges of the inner front and rear panel members can be reinforced at the areas where the gusset is attached to further prevent tearing or detachment. All these advantages add to the durability of the file and prolongs its useful life.

Figure 21:
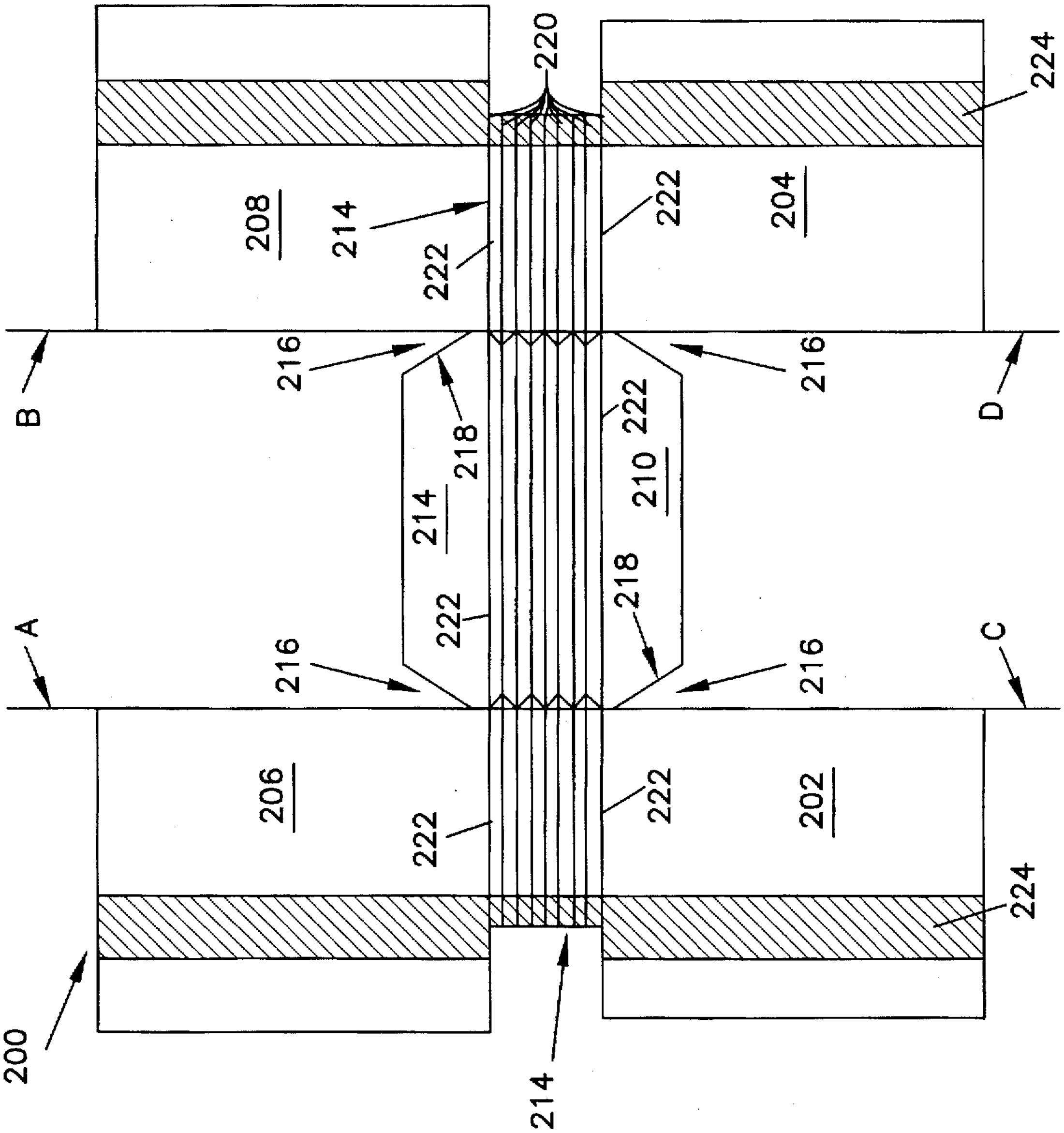
FIG. 21 is a front view of an integral blank including front and rear side panels, front and rear central panels, a bottom gusset, and side gussets in a flat position prior to creasing the gusset fold lines and panel member-gusset fold lines.

Referring now to FIG. 21, there is illustrated an integral H-shaped blank 200 which includes two front side panel members 202, 204, or front cover panel members, and two rear side panel members 206, 208, or rear cover panel members, and front and rear central panel members 210, 212, or anchor panel members intermediate the front and rear side panel members 202, 204, 206, 208, and a bottom and side gusset 214. The front and rear central panel members 210, 212 are separated from the front and rear side panel members 202, 204, 206, 208 by cut outs or cuts 216. A portion of each cut out 216 is angled 218 to assist in the folding process. The front side of the blank 200, i.e., the side which forms the inner surfaces of the folder is shown in a flat position prior to creasing the gusset folds 220 and panel member gusset fold lines 222. This front side of the blank 200 includes strips of reinforcing material 224, such as paper, polyester, TYVEK, or the like along the length of the front and rear side panel members 202, 204, 206, 208.

Figure 22:
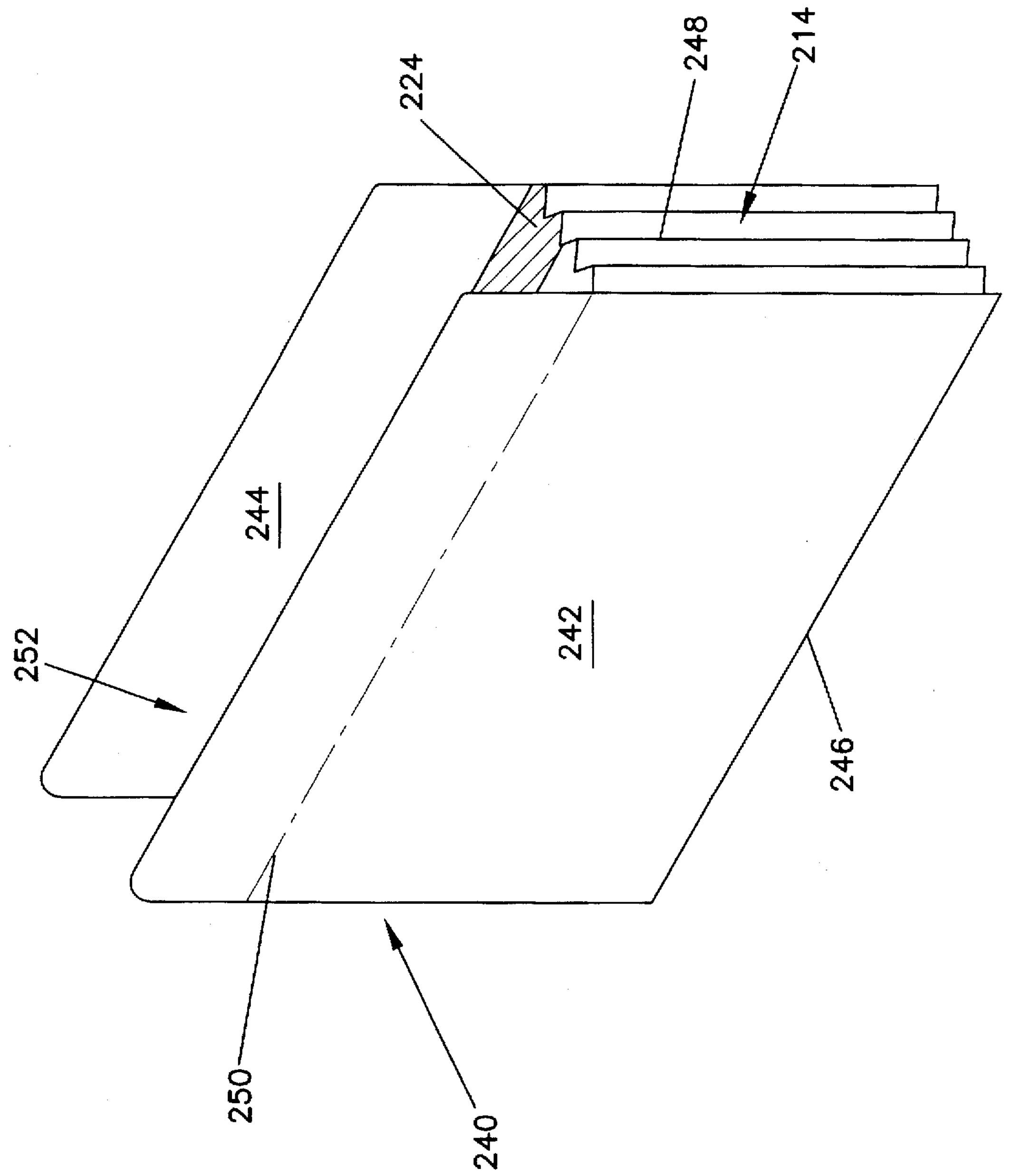
FIG. 22 is a perspective view of the folder assembled from the blank of FIG. 21.

The reinforcing material strips 224 may be placed such that the portion over the gusset 214 may be folded over to the back side of the blank 200 as well, or, as shown in FIG. 22, this folded over portion is cut away altogether, and is not present on the outside of the folder 240. Alternately, the reinforcing material strips 224 may extend across the gusset 214 only, or across the gusset 214 and partially along the respective front and rear side panel members 202, 204, 206, 208. Additionally, the entire gusset (length and width) 214, may be reinforced with this reinforcing material. The reinforcing material for the gusset may extend onto the respective front and rear side panel members 202, 204, 206, 208, and the respective central panel members 210, 212. The rear side of the blank 200 could also be reinforced as described above if so desired. The reinforcing material strips 224 can be easily applied by lamination onto the blank 200 or can be glued to the blank 200. Additional attachment methods described above with respect to FIG. 11 may also be used.

This blank 200 can be made of any of the materials described above with respect to the blank 100 of FIG. 11. For expandable folders requiring the greatest strength, the blank 200 can be made of a plastic such as polyethylene, polypropylene, TYVEK, or the like, or a plastic coated paper composite or laminate. If paper is used as the material of the blank 200, a reinforcing layer or layers may be provided at least on the outer surface of the gusset and onto the front and side panel members in the same manner described above with respect to the blank 100 of FIG. 11.

Preferably, the reinforcing layer extends along and covers the entire exterior surface of the blank 200 to provide the full exterior reinforcement. This allows the entire folder to be made of plastic or of a plastic film coated paper laminate or composite. With such materials, even a conventional five piece folder structure has component connections of enhanced strength and increased wear and abrasion resistance. When made out of plastic, the components can be ultrasonically welded to assemble the folder.

The folder is formed by making the folds in the gusset 220, bending the front and rear side panel members 202, 204, 206, 208 and front and rear central panel members 210, 212 upwardly by folding at the panel member-gusset fold lines 222, bending the side gussets upwardly by folding along the lines which extend between the side and central panels A–C and B–D, respectively, and then by bending the side panel members 202, 204, 206, 208 inward so that they fold one in front of and one behind the front and rear central panel members 210, 212 as shown in FIG. 22, or alternatively attached to each other and then in front of or behind the central panel members 210, 212. The side gussets 214 are formed by folding the blank 200 at its side panels 202, 204, 206, 208 along lines A–C and B–D, respectively, up to their point of intersection with lines 222. These panel members 202,204, 206, 208 may then be secured to their respective central panel members 210, 212 by glue or an adhesive, by cohesive bonding or by ultrasonic welding, depending upon the material of the blank.

FIG. 22 illustrates the folder 240 after assembly, comprising a front panel 242, formed of the front side panel members 202, 204 (FIG. 21) and front central panel member 210 (FIG. 21), and a rear panel 244, formed by the rear side panel members 206, 208 (FIG. 21), and rear central panel member 212 (FIG. 21). The front and rear panels 242, 244 are connected by the gusset 214, which forms the bottom 246 and the sides 248 of the folder 240. The folder 240 has been provided with a fold line 250 along the front panel 242 and is open along the top 252, where the reinforcing material strips 224 on the inner surfaces of the folder 240 may be seen in part. This open top 252 facilitates the insertion of papers, documents or other items, which are to be stored in the folder 240. If desired, the corners of the front panel 242 and rear panel 244 can be rounded by cutting.

While the present invention has been particularly shown and described with reference to the preferred embodiments thereof, it will be understood by those skilled in the art that various changes in form and details may be made thereto. For example, the gusset can be reinforce with both an outer and inner reinforcement, or a layer of plastic film can be applied to the gusset after assembly of the folder as reinforcement. It is to be understood that all such changes are within the true spirit and scope of the present invention as defined by the appended claims.

What is claimed is:

1. A method of making an expandable folder, comprising:

providing an integral blank of material, the blank including first and second panels separated by a gusset portion and having a first surface;

attaching separate right and left reinforcing strips on a first face of the blank, the right and left reinforcing strips each being attached respectively to right and left sides of the first and second panels, and right and left outer edges of the gusset portion;

forming a gusset in the gusset portion intermediate the first and second panels, by forming a plurality of folds, the folds being in close proximity and substantially parallel to each other, the folds extending entirely across the gusset portion;

making a plurality of substantially parallel cuts extending inwards from top and bottom edges of the first and second panels respectively to the gusset to form respective central panel members on the first and second panels, the central panel members separated from right and left panels on the first and second panels respectively, each central panel member being intermediate the side panels of the respective first and second panels;

folding the first surfaces of the central panel members and the left and right side panels of the first and second panels along respective edges of the gusset, towards the first surface of the gusset;

providing corner fold lines across the gusset substantially perpendicular to the plurality of folds, the corner fold lines extending between the cuts separating the central panel members and side panel members on respective first and second panels, the corner fold lines being substantially parallel; and attaching the right and left side panels of the first panel and substantially all of the central panel member of the first panel together to form a unitary front panel, and attaching the right and left side panels of the second panel member and substantially all of the central panel member of the second panel together to form a unitary back panel.

2. The method of claim 1, wherein the integral blank is rectangular in shape and comprising the further steps of cutting and removing blank material from areas in the first and second panels bounded by the right and left side panels and the gusset portion.

3. The method of claim 1, comprising the further step of providing an H-shaped integral blank with the side panels on the first and second panels extending beyond peripheral edges of the respective central panel members and gusset portions.

4. The method of claim 1, comprising the further step of folding the blank so that the first surface of the blank forms inside surfaces of the expandable folder.

* * * * *